(12) United States Patent
Chaudhary et al.

(10) Patent No.: US 11,748,242 B2
(45) Date of Patent: Sep. 5, 2023

(54) PROACTIVE MONITORING OF A SOFTWARE APPLICATION FRAMEWORK

(71) Applicants: ATLASSIAN PTY LTD, Sydney (AU); ATLASSIAN, INC., San Francisco, CA (US)

(72) Inventors: Jitendra Kumar Chaudhary, Alwar (IN); Aneesh Pulickal Karunakaran, Bangalore (IN); Chethan C, Magadi (IN); Vishnu Pradeep, Ernakulam (IN)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 7 days.

(21) Appl. No.: 17/177,806

(22) Filed: Feb. 17, 2021

(65) Prior Publication Data

US 2022/0261338 A1    Aug. 18, 2022

(51) Int. Cl.
*G06F 11/36*     (2006.01)
*G06F 11/34*     (2006.01)
*G06F 11/30*     (2006.01)

(52) U.S. Cl.
CPC ........ *G06F 11/3688* (2013.01); *G06F 11/302* (2013.01); *G06F 11/3414* (2013.01); *G06F 11/3692* (2013.01); *G06F 11/3696* (2013.01)

(58) Field of Classification Search
CPC . G06F 11/36–3696; G06F 11/34–3495; G06F 11/302
See application file for complete search history.

(56) References Cited

U.S. PATENT DOCUMENTS

| | | | | |
|---|---|---|---|---|
| 6,775,644 | B2 * | 8/2004 | Myers | G06F 11/3414 |
| | | | | 714/E11.193 |
| 7,539,904 | B2 * | 5/2009 | Lau | G06F 11/3419 |
| | | | | 714/41 |
| 9,558,465 | B1 | 1/2017 | Arguelles et al. | |
| 10,387,231 | B2 * | 8/2019 | Papak | G06F 11/0709 |
| 2004/0039550 | A1 * | 2/2004 | Myers | G06F 11/3414 |
| | | | | 714/E11.193 |
| 2007/0168751 | A1 * | 7/2007 | Lau | G06F 11/3419 |
| | | | | 714/41 |

(Continued)

OTHER PUBLICATIONS

Kesim, D., Assessing Reslience of Software Systems by Application of Chaos Engineering, University of Stuttgart [online], 2019 [ retrieved Feb. 6, 2022], Retrieved from Internet: <URL: https://elib.uni-stuttgart.de/bitstream/11682/10918/1/bachelor_thesis1_%20%283%29.pdf>, pp. i-187.*

(Continued)

*Primary Examiner* — Todd Aguilera
(74) *Attorney, Agent, or Firm* — Alston & Bird LLP

(57) ABSTRACT

Systems and methods provide techniques for more effective and efficient proactive monitoring of a target software application framework. In response, embodiments of the present invention provide methods, apparatuses, systems, computing devices, and/or the like that are configured to enable effective and efficient proactive monitoring of a target software application framework using a load testing experiment definition data object, wherein the load testing experiment definition data object describes a load increase action definition, a steady state definition, and a fault inducement action definition.

17 Claims, 29 Drawing Sheets

(56) References Cited

U.S. PATENT DOCUMENTS

| | | | |
|---|---|---|---|
| 2010/0287535 A1* | 11/2010 | Kim | G06F 11/3688 |
| | | | 717/127 |
| 2018/0060202 A1* | 3/2018 | Papak | G06F 11/3409 |
| 2020/0210149 A1 | 7/2020 | Caldwell et al. | |
| 2022/0100645 A1* | 3/2022 | Paterson-Jones | G06F 9/45558 |

OTHER PUBLICATIONS

Anonymous, "An Open API for Chaos Engineering Experiments", ChaosToolkit.org [online], 2017 [retrieved Feb. 6, 2022], Retrieved from Internet: <URL: https://web.archive.org/web/20180509024656/http://chaostoolkit.org/reference/api/experiment/> whole document.*

* cited by examiner

```
{
        "service": "todo-backend",
        "environment": "stg-east",
        "name": "CPU Stress on todo-backend service",
        "version": "1.0.0",
        "premises": [
                {
                        "input_data": {
                                "apis": ["https://todo-backend.us-east-1.staging.at1-paas.net/projects", "https://todo-backend.us-east-1.staging.at1-paas.net/projects/1", "https://todo-backend.us-east-1.staging.at1-paas.net/projects/1/tasks"],
                                "user_count": 100
                        }
                }
        ],
        "description": "This will be user defined base template #1",
        "task_groups": [
                {
                        "name": "Task Group#1",
                        "execution_mode": "sequential",
                        "faults": [
                                {
                                        "fault_category": "stress",
                                        "fault_action": "stress_cpu",
                                        "parameters": {
                                                "percentage": 60,
                                                "timeout_seconds": 300,
                                                "container": "microservice"
                                        }
                                }
                        ],
                        "steady_states": [
                                {
                                        "probe_category": "signalfx",
                                        "probe_action": "signalfx_query",
                                        "parameters": {
                                                "probe_metric": "cpu_saturation",
                                                "probe_threshold": 70
                                        }
                                }
                        ]
                }
        ]
}
```

901 (overall)
911 — premises
914 — user_count: 100
912 — task_groups/faults
915 — fault_category
916 — fault_action
918 — percentage
919 — timeout_seconds
917 — container
913 — steady_states
920 — probe_category
921 — probe_action
922 — probe_metric
923 — probe_threshold

FIG. 9A

```
{
        "service": "todo-backend",
        "environment": "stg-east",
        "name": "Memory Stress on todo-backend service",
        "version": "1.0.0",
        "premises": [
            {
                "input_data": {
                    "apis": ["https://todo-backend.us-east-1.staging.at1-paas.net/projects", "https://todo-backend.us-east-1.staging.at1-paas.net/projects/1", "https://todo-backend.us-east-1.staging.at1-paas.net/projects/1/tasks"],
                    "user_count": 100           927
                }
            }
        ],
        "description": "This will be user defined base template #1",
        "task_groups": [
            {
                "name": "Task Group#1",
                "execution_mode": "sequential",
                "faults": [
                    {
                        "fault_category": "stress",          928
                        "fault_action": "stress_memory",     929
                        "parameters": {
                            "percentage": 60,                931
                            "timeout_seconds": 300,                  932
                            "container": "microservice"              930
                        }
                    }
                ],
                "steady_states": [
                    {
                        "probe_category": "signalfx",        9931
                        "probe_action": "signalfx_query",    9932
                        "parameters": {
                            "probe_metric": "cpu_saturation",    933
                            "probe_threshold": 70        934
                        }
                    }
                ]
            }
        ]
}
```

902

924 — premises
925 — faults
926 — steady_states

FIG. 9B

```
{
    "service": "todo-backend",
    "environment": "stg-east",
    "name": "Network Delay on todo-backend service",
    "version": "1.0.0",
    "premises": [
        {
            "input_data": {
                "apis": ["https://todo-backend.us-east-1.staging.at1-paas.net/projects", "https://todo-backend.us-east-1.staging.at1-paas.net/projects/1", "https://todo-backend.us-east-1.staging.at1-paas.net/projects/1/tasks"],
                "user_count": 100                938
            }
        }
    ],
    "description": "This will be user defined base template #1",
    "task_groups": [
        {
            "name": "Task Group#1",
            "execution_mode": "sequential",
            "faults": [
                {
                    "fault_category": "network",       939
                    "fault_action": "network_delay",   940
                    "parameters": {
                        "delay": 1000,                 942
                        "timeout_seconds": 300,        943
                        "container": "microservice"    941
                    }
                }
            ],
            "steady_states": [
                {
                    "probe_category": "signalfx",      944
                    "probe_action": "signalfx_query",  945
                    "parameters": {
                        "probe_metric": "cpu_saturation",   946
                        "probe_threshold": 90               947
                    }
                },
                {
                    "probe_category": "signalfx",      948
                    "probe_action": "signalfx_query",  949
                    "parameters": {
                        "probe_metric": "mem_saturation",   950
                        "probe_threshold": 70               951
                    }
                }
            ]
        }
    ]
}
```

935 — premises block
936 — faults block
937 — steady_states block
903 — overall template

FIG. 9C

```
{
        "service": "todo-backend",
        "environment": "stg-east",
        "name": "IO Load on todo-backend service",
        "version": "1.0.0",
        "premises": [
            {
                "input_data": {
                    "apis": ["https://todo-backend.us-east-1.staging.at1-paas.net/projects", "https://todo-backend.us-east-1.staging.at1-paas.net/projects/1", "https://todo-backend.us-east-1.staging.at1-paas.net/projects/1/tasks"],
                    "user_count": 1000        955
                }
            }
        ],
        "description": "This will be user defined base template # 1",
        "task_groups": [
            {
                "name": "Task Group#1",
                "execution_mode": "sequential",
                "faults": [
                    {
                        "fault_category": "stress",         956
                        "fault_action": "stress_io",         957
                        "parameters": {
                            "percentage": 70,              959
                            "timeout_seconds": 300,         960
                            "container": "microservice"     958
                        }
                    }
                ],
                "steady_states": [
                    {
                        "probe_category": "signalfx",       961
                        "probe_action": "signalfx_query",   962
                        "parameters": {
                            "probe_metric": "mem_saturation",    963
                            "probe_threshold": 70               964
                        }
                    }
                ]
            }
        ]
}
```

{
            "service": "todo-backend",
            "environment": "stg-east",
            "name": "IO Load on todo-backend service",
            "version": "1.0.0",
            "premises": [
                    {
                            "input_data": {
                                    "apis": ["https://todo-backend.us-east-1.staging.at1-paas.net
966 ┤   /projects", "https://todo-backend.us-east-1.staging.at1-paas.net
        /projects/1", "https://todo-backend.us-east-1.staging.at1-paas.net
        /projects/1/tasks"],
                                    "user_count": 1000     969
                            }
                    }
            ],
            "description": "This will be user defined base template #1",
            "task_groups": [
                    {
                            "name": "Task Group#1",
                            "execution_mode": "sequential",
                            "faults": [
                                    {
                                            "fault_category": "stress",         970
967 ┤                                       "fault_action": "stress_io",        971
                                            "parameters": {
                                                    "percentage": 70,           973
                                                    "timeout_seconds": 300,     974
                                                    "container": "microservice" 972
                                            }
                                    }
                            ],
                            "steady_states": [
                                    {
                                            "probe_category": "signalfx",       975
                                            "probe_action": "signalfx_query",   976
                                            "parameters": {
968 ┤                                               "probe_metric": "mem_saturation",  977
                                                    "probe_threshold": 70       978
                                            }
                                    }
                            ]
                    }
            ]
    }
```

FIG. 9E

```
{
    "service": "todo-backend",
    "environment": "stg-east",
    "name": "Disk Fill on todo-backend service",
    "version": "1.0.0",
    "premises": [
        {
            "input_data": {
                "apis": ["https://todo-backend.us-east-1.staging.at1-paas.net/projects", "https://todo-backend.us-east-1.staging.at1-paas.net/projects/1", "https://todo-backend.us-east-1.staging.at1-paas.net/projects/1/tasks"],
                "user_count": 1000          982
            }
        }
    ],
    "description": "This will be user defined base template #1",
    "task_groups": [
        {
            "name": "Task Group#1",
            "execution_mode": "sequential",
            "faults": [
                {
                    "fault_category": "stress",          983
                    "fault_action": "stress_disk",       984
                    "parameters": {
                        "percentage": 60,                986
                        "timeout_seconds": 300,          987
                        "container": "microservice"      985
                    }
                }
            ],
            "steady_states": [
                {
                    "probe_category": "signalfx",        988
                    "probe_action": "signalfx_query",    989
                    "parameters": {
                        "probe_metric": "cpu_saturation",   990
                        "probe_threshold": 70               991
                    ]
                },
                {
                    "probe_category": "signalfx",        992
                    "probe_action": "signalfx_query",    993
                    "parameters": {
                        "probe_metric": "mem_saturation",   994
                        "probe_threshold": 70               995
                    }
                }
            ]
        }
    ]
}
```

979 → premises block
980 → faults block
981 → steady_states block
906 → overall
982, 983, 984, 985, 986, 987, 988, 989, 990, 991, 992, 993, 994, 995

FIG. 9F

```
{
        "service": "todo-backend",
        "environment": "stg-east",
        "name": "CPU Stress on todo-backend service",
        "version": "1.0.0",
        "description": "This will be user defined base template #1",
        "task_groups": [
            {
                "name": "Task Group#1",
                "execution_mode": "sequential",
                "faults": [
                    {
                        "fault_category": "stress",         998
                        "fault_action": "stress_cpu",       999
                        "parameters": {
                            "percentage": 60,                9002
                            "timeout_seconds": 300,          9003
                            "container": "microservice"     9001
                        }
                    }
                ],
                "steady_states": [
                    {
                        "probe_category": "signalfx",       9004
                        "probe_action": "signalfx_query",    9005
                        "parameters": {
                            "probe_metric": "cpu_saturation",   9006
                            "probe_threshold": 70        9007
                        }
                    }
                ]
            }
        ]
}
```

996 = task_groups faults block
997 = steady_states block
907 = overall template

Create Wargame Plan

○ ——— ○ ——— ○ ——— ○ ——— ○ ——— ○
Introduction | Template Library | Premise Setup | Task Groups | Preview | Confirmation Name*
| CPU stress with a premise script |

Micros Environment
| stg-east | > |

[Next]

FIG. 11A

Create Wargame Plan

1104

○───────○───────○───────○───────○───────○
Introduction  Template Library  Premise Setup  Task Groups  Preview  Confirmation

Name
[Custom script]

Description
[                    ]

Premise Type
○ APIs
◉ Scripts

Script Name*     Script Branch*
[/get/todo-backend-template.py]   [jchaudhary/custom-scripts]

Advanced Options
No. of Users*    Ramp-up time (secs)    Steady state time (secs)
[50]           [120]            [600]

Audience
[todo-backend]

[Back] [Next]          [Cancel] [Save]

FIG. 11D

Create Wargame Plan                                                                 1108

Introduction — Template Library — Premise Setup — Task Groups — Preview — Confirmation

Basic Information

| | |
|---|---|
| name | CPU stress with a premise script |
| environment | stg-east |

Premise

| | |
|---|---|
| name | Custom script |
| description | |
| Provider | perfhammer |
| PremiseType | perfhammer_scripts |

Premise Data — Parameters

| Key | Value |
|---|---|
| user_count | 50 |
| steady_state_time | 600 |
| ramp_up_time | 120 |
| script_time | /get/todo-backend-template.py |
| branch | jchaudhary/custom-scripts |

⎬ 1171

Task Group #1

Steady states

Category: signalfx
Action: signalfx_query
Parameters

| Key | Value |
|---|---|
| timeout | 600 |
| probe_threshold | 75 |

Faults

Category: stress
Action: stress_cpu
Parameters

| Key | Value |
|---|---|
| percentage | 50 |
| timeout_threshold | 600 |

⎬ 1172

Back  Next

FIG. 11H

PROACTIVE MONITORING OF A SOFTWARE APPLICATION FRAMEWORK

BACKGROUND

Various methods, apparatuses, and systems are configured to provide techniques for monitoring software application frameworks. Applicant has identified many deficiencies and problems associated with existing methods, apparatuses, and systems for monitoring software application frameworks. Through applied effort, ingenuity, and innovation, these identified deficiencies and problems have been solved by developing solutions that are in accordance with the embodiments of the present invention, many examples of which are described in detail herein.

BRIEF SUMMARY

Systems and methods provide techniques for more effective and efficient proactive monitoring of a target software application framework. In response, embodiments of the present invention provide methods, apparatuses, systems, computing devices, and/or the like that are configured to enable effective and efficient proactive monitoring of a target software application framework using a load testing experiment definition data object, where the load testing experiment definition data object describes a load increase action definition, a steady state definition, and a fault inducement action definition.

In accordance with one aspect, a computer-implemented method is provided. In one embodiment, the computer-implemented method comprises: identifying a load testing experiment definition data object, wherein the load testing experiment definition data object describes a load increase action definition, a steady state definition, and a fault inducement action definition; causing execution of one or more load increase operations with respect to the target software application framework, wherein the one or more load increase operations satisfy one or more load increase execution parameters described by the load increase definition; in response to the execution of the one or more load increase action operations, monitoring the target software application framework to determine whether the target software application framework satisfies one or more steady state probe conditions defined by the steady state definition; in response to determining that the target software application framework satisfies the one or more steady state probe conditions, causing execution of one or more fault inducement operations with respect to the target software application framework, wherein the one or more fault inducement operations are defined by the fault inducement action definition; in response to the execution of the one or more fault inducement operations, monitoring the target software application framework to determine whether the target software application framework satisfies at least one of one or more fault inducement halt conditions, wherein the one or more one or more fault inducement halt conditions are determined based at least in part on the one or more steady state probe conditions; in response to determining that the target software application framework satisfies the one or more fault inducement halt conditions, determining a current operational state of the target software application framework; and generate a predicted software resilience signature for the target software application framework based on the current operational state of the target software application framework.

In accordance with another aspect, a computer program product is provided. The computer program product may comprise at least one computer-readable storage medium having computer-readable program code portions stored therein, the computer-readable program code portions comprising executable portions configured to: identify a load testing experiment definition data object, wherein the load testing experiment definition data object describes a load increase action definition, a steady state definition, and a fault inducement action definition; cause execution of one or more load increase operations with respect to the target software application framework, wherein the one or more load increase operations satisfy one or more load increase execution parameters described by the load increase definition; in response to the execution of the one or more load increase action operations, monitor the target software application framework to determine whether the target software application framework satisfies one or more steady state probe conditions defined by the steady state definition; in response to determining that the target software application framework satisfies the one or more steady state probe conditions, cause execution of one or more fault inducement operations with respect to the target software application framework, wherein the one or more fault inducement operations are defined by the fault inducement action definition; in response to the execution of the one or more fault inducement operations, monitor the target software application framework to determine whether the target software application framework satisfies at least one of one or more fault inducement halt conditions, wherein the one or more one or more fault inducement halt conditions are determined based at least in part on the one or more steady state probe conditions; in response to determining that the target software application framework satisfies the one or more fault inducement halt conditions, determine a current operational state of the target software application framework; and generate a predicted software resilience signature for the target software application framework based on the current operational state of the target software application framework.

In accordance with yet another aspect, an apparatus comprising at least one processor and at least one memory including computer program code is provided. In one embodiment, the at least one memory and the computer program code may be configured to, with the processor, cause the apparatus to: identify a load testing experiment definition data object, wherein the load testing experiment definition data object describes a load increase action definition, a steady state definition, and a fault inducement action definition; cause execution of one or more load increase operations with respect to the target software application framework, wherein the one or more load increase operations satisfy one or more load increase execution parameters described by the load increase definition; in response to the execution of the one or more load increase action operations, monitor the target software application framework to determine whether the target software application framework satisfies one or more steady state probe conditions defined by the steady state definition; in response to determining that the target software application framework satisfies the one or more steady state probe conditions, cause execution of one or more fault inducement operations with respect to the target software application framework, wherein the one or more fault inducement operations are defined by the fault inducement action definition; in response to the execution of the one or more fault inducement operations, monitor the target software application framework to determine whether the target software application framework satisfies at least one of one or more fault inducement halt conditions, wherein the one or more one or more fault inducement halt conditions are determined based at least in part on the one or more steady state probe conditions; in response to determining that the target software application framework satisfies the one or more fault inducement halt conditions, determine a current operational state of the target software application framework; and generate a predicted software resilience signature for the target software application framework based on the current operational state of the target software application framework.

BRIEF DESCRIPTION OF THE SEVERAL VIEW OF THE DRAWINGS

Having thus described some embodiments in general terms, references will now be made to the accompanying drawings, which are not drawn to scale, and wherein:

FIGS. 7A-7D provide operational examples of data flow diagrams for performing load testing experiments in accordance with at least some embodiments of the present invention.

Figure 8:
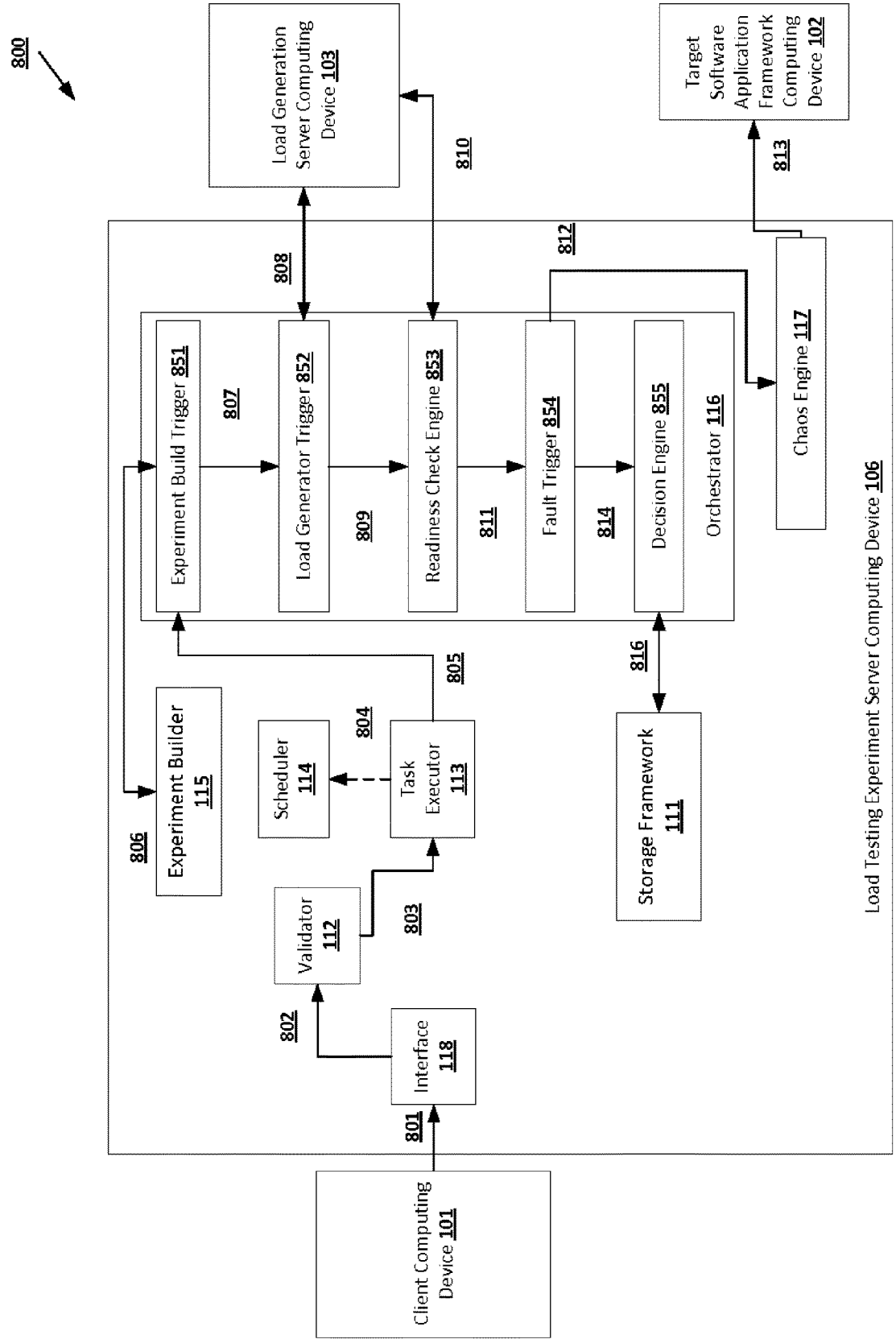

FIG. 8 is a data flow diagram of an example process for proactive monitoring of a software application framework in accordance with at least some embodiments of the present invention.

FIGS. 9A-9G provide operational examples of seven load experiment definition data objects in accordance with at least some embodiments of the present invention.

Figure 10A:
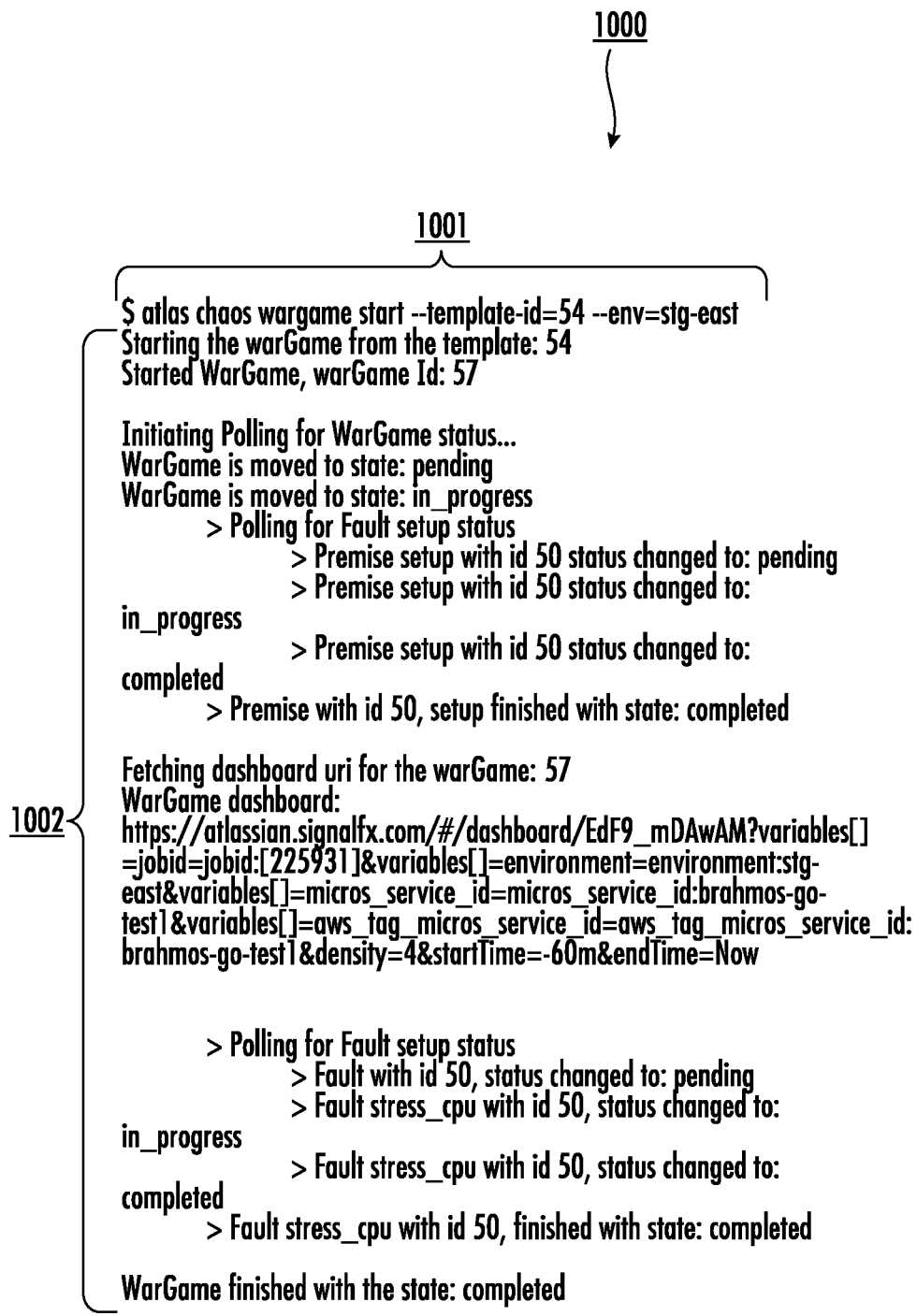
Figure 10B:
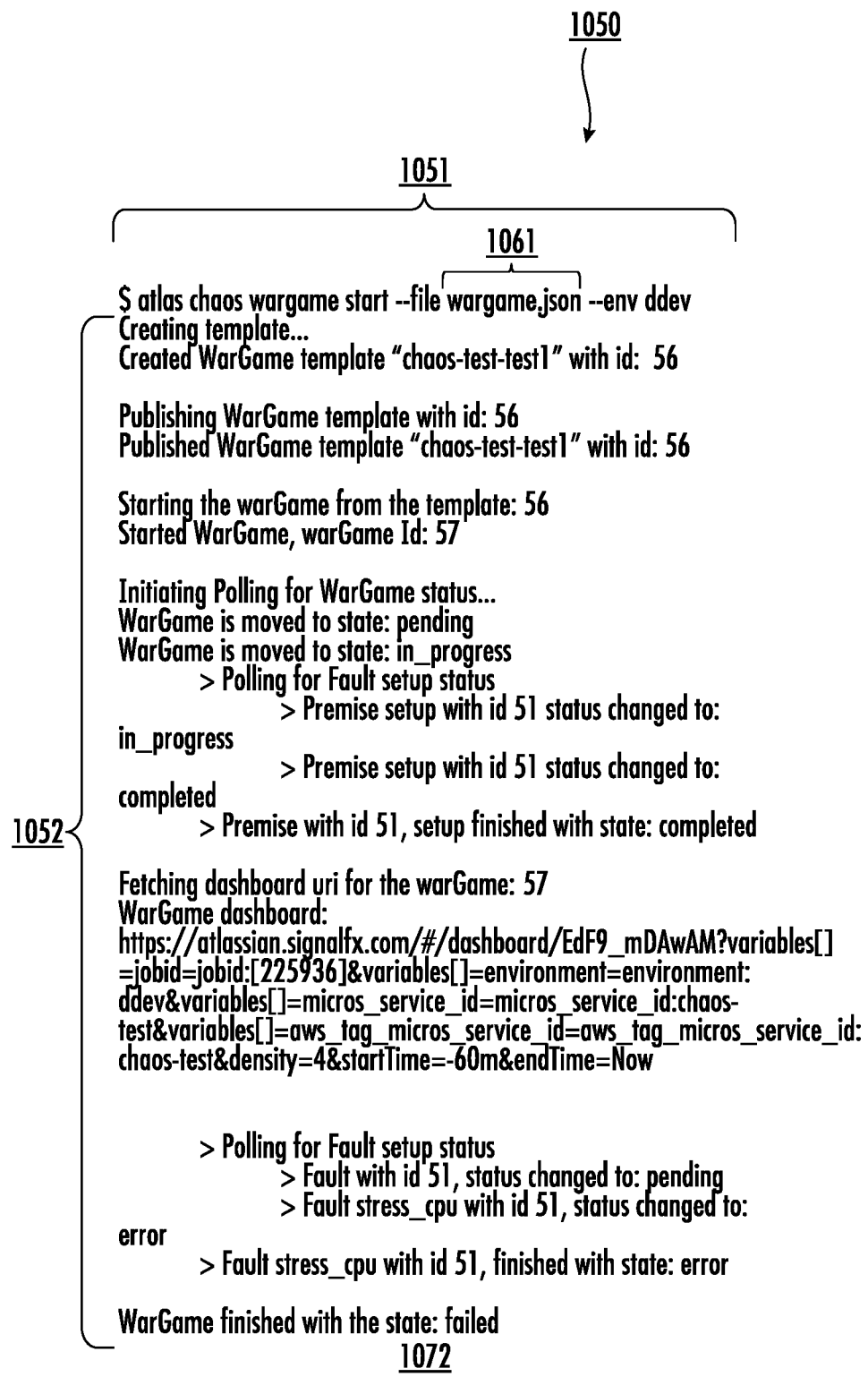

FIGS. 10A-10B provide operational examples of command-line interfaces for performing load testing experiments in accordance with at least some embodiments of the present invention.

FIGS. 11A-11I provide operational examples of graphical user interfaces for performing load testing experiments in accordance with at least some embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention address technical problems associated with efficiently and reliably performing proactive monitoring of complex software application frameworks. The disclosed techniques can be utilized by a load testing experiment server computing device to generate predictive insights that enhance effectiveness and efficiency of performing software application framework monitoring with respect to complex software application frameworks.

A complex software application framework is typically characterized by large networks of interdependent services and microservices that support a myriad of software features and applications. Indeed, some large complex software application frameworks may be comprised of topologies of 1,500 or more interdependent services and microservices. Such complex software application frameworks are nimble, highly configurable, and enable robust collaboration and communication between users at the individual, team, and enterprise level.

Complex software application frameworks typically include large numbers of software applications. Each software application includes a number of features, with many features (e.g., user authentication features) shared between multiple software applications. Other features are supported only by one associated software application or a defined subset of software applications.

A given complex software application framework could support hundreds of software applications and hundreds of thousands of features. Those applications and features could be supported by thousands of services and microservices that exist in vast and ever-changing interdependent layers. Adding to this complexity is the fact that at any given time, a great number of software development teams may be constantly, yet unexpectedly, releasing code updates that change various software services, launch new software services, change existing features of existing software applications, add new software applications, add new features to existing software applications, and/or the like.

The large number of software independent services, microservices, software applications, and features supported by a complex software application framework makes monitoring of such complex software application frameworks challenging. This challenge is compounded when the monitoring is performed in a proactive manner to detect system failures prior to a potential future breakdown time, a monitoring requirement that may be essential to maintaining reliability and operational integrity of many maintenance-critical software application frameworks.

Various embodiments of the present invention address the above-described efficiency and reliability challenges associated with proactive monitoring of complex software application frameworks by performing proactive load testing experiments that are defined based on at least three sets of load experiment definition data: load increase action data, steady state detection data, and fault inducement action data.

Using load increase action data enables performing proactive load testing experiments under conditions defined based on threshold amounts of usage loads with respect to target software application frameworks. In many instances, proactive monitoring requires simulating usage load scenarios that may not be available at testing time. Aspects of the present invention enable defining load increase action execution parameters for load increase actions and performing load increase actions in response to execution of the noted load increase actions. By enabling generating simulated usage load scenarios in the described manner, various embodiments of the present invention increase the reliability of performing proactive monitoring of target software application frameworks and the accuracy of the output data generated as a result of performing proactive monitoring of target software application frameworks.

Using steady state detection data enables defining steady state conditions for a software application framework, where the satisfaction of the steady state conditions by the software application framework may cause termination of at least one of load increase actions and fault inducement actions. Performing proactive load texting experiments based on steady state conditions defined by the steady state detection data may in many cases reduce the duration of load testing experiments and thus increase the efficiency of performing proactive monitoring of software application frameworks. This is in contrast to persistent monitoring of software application frameworks which requires continuous usage of network resources, processing resources, and storage resources to perform persistent monitoring of software application frameworks over typically long periods of time.

The fault inducement action data enable performing fault inducement actions under conditions facilitated by load increase actions in accordance with steady state action conditions. In some embodiments, collective user of load increase action data, steady state detection data, and fault inducement action data enables performing proactive monitoring of complex software application frameworks under the influence of particular load increase actions as well as fault inducement actions, an approach that leads to highly relevant and highly reliable proactive monitoring outputs. The noted proactive monitoring outputs can then be used to increase resilience and efficiency of the monitored software application frameworks.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client computing device" refers to a combination of computer hardware and/or software that is configured to access a service made available by a server. The server is often (but not always) on another computer system, in which case the client accesses the service by way of a network. Client computing devices may include, without limitation, smart phones, tablet computers, laptop computers, wearables, personal computers, enterprise computers, and the like.

The term "server computing device" refers to a combination of computer hardware and/or software that is configured to provide a service to a client device. An example of a server computing device is the load testing experiment server computing device 106 of FIG. 1. In some embodiments, a server computing device communicates with one or more client computing devices using one or more computer networks.

The term "load testing experiment definition data object" refers to a data entity that is generated by a client computing device and transmitted to a load testing experiment server computing device. The load testing experiment definition data object describes one or more requested experiment properties of a load testing experiment that an end user of the client computing device requests be performed with respect to a target software application framework. The requested experiment properties described by a load testing experiment definition data object include a load increase action definition, a steady state definition, and a fault inducement action definition. In some embodiments, a load testing experiment definition data object includes at least one of the following: one or more experiment runtime configuration properties of the requested load testing experiment that describe whether the requested load testing experiment should be performed on-demand or in a prescheduled fashion, and one or more experiment pre-condition properties of the requested load testing experiment that describe one or more pre-conditions (e.g., one or more usage-load-based pre-conditions) that should be present before performing the requested load testing experiment.

The term "load increase action definition" refers to one or more data fields of a load testing experiment definition data object that define one or more load increase execution parameters of a load increase action (i.e., a related set of load increase operations). While various embodiments of the present invention describe a load testing experiment definition data object that is associated with a single load increase action definition, a person of ordinary skill in the relevant technology will recognize that a load testing experiment may include two or more load increase actions, which may in turn lead to generating a load testing experiment definition data object that includes two or more load increase action definitions corresponding to the two or more load increase actions. For example, if a load testing experiment includes increasing user activity by a first group of user profiles having a first access level to a first threshold amount as well as increasing user activity by a second group of user profiles having a second access level to a second threshold amount, then the load experiment definition data object that corresponds to the described load testing experiment may include two load increase action definitions: a first load increase action definition corresponding to the load increase action of increasing user activity by a first group of user profiles having a first access level to a first threshold amount and a second load increase action definition correspond to the load increase action of increasing user activity by a second group of user profiles having a second access level to a second threshold amount.

The term "load increase execution parameter" refers to a data entity that is generated by a client computing device and transmitted to a load testing experiment server computing device as part of a load experiment testing definition data object. The load increase execution parameter describes a defined property of a load increase action. Examples of load increase execution parameters include: a load increase execution parameter that defines an identifier of a load increase action, a load increase magnitude parameter that defines the required amount of user load increase for a load increase action, a load increase parallel execution mode parameter that defines whether a load increase action should be performed in parallel or sequentially, a load increase execution parameter that defines where user activity data used in a load increase action is retrieved from, a load increase execution parameter that defines whether retrieval of user activity data used in a load increase action is performed in parallel or sequentially, and/or the like. A load increase execution parameter may correspond to a data field of a load experiment definition data object that describes a property of a load increase action that is a stage of the load testing experiment associated with the load testing experiment definition data object, as opposed to a property of a steady state probe action that is a stage of the load testing experiment associated with the load testing experiment definition data object or a property of a fault inducement action probe that is a stage of the load testing experiment associated with the load testing experiment definition data object.

The term "steady state definition" refers to one or more data fields of a load testing experiment definition data object that define a related set of one or more steady state probe conditions. In response to (e.g., during) the execution of a load increase action with respect to a target software application framework associated with the load testing experiment definition data object, the target software application framework is monitored (i.e., probed) to determine whether the set of related steady state probe conditions associated with the load increase action are satisfied. In response to determining that the set of related steady state probe conditions are satisfied, a fault inducement action (i.e., a related set of fault inducement operations) associated with the load increase action is performed. Accordingly, while various embodiments of the present invention describe a load testing experiment definition data object that includes a single steady state definition, a person of ordinary skill in the relevant technology will recognize that a load testing experiment definition data object may describe two or more steady state probe conditions each associated with a load increase action of two or more load increase actions associated with the load testing experiment definition data object. For example, if a load testing experiment includes increasing user activity by a first group of user profiles having a first access level to a first threshold amount until a first network activity level is reached as well as increasing user activity by a second group of user profiles having a second access level to a second threshold amount until a second network activity level is reached, then the load experiment definition data object that corresponds to the described load testing experiment may include two steady state definitions: a first steady state definition that describes the first network activity level and a second steady state definition that describes the second network activity level.

The term "steady state probe condition" refers to a data entity that is generated by a client computing device and transmitted to a load testing experiment server computing device as part of a load experiment testing definition data object. The steady state probe condition describes a condition of a target software application framework whose satisfaction is monitored in response to (e.g., during) execution of a load increase action with respect to the target software application framework. Examples of steady state probe conditions include network-activity-based conditions, memory-usage-based conditions, processor-usage-based conditions, storage-usage-based conditions, and/or the like. In some embodiments, a steady state probe condition is defined by a corresponding load increase action definition data object. In some of the noted embodiments, the steady state probe condition is defined by the corresponding load increase action definition data object using a steady state probe action that describes the monitoring action that should be performed to determine whether the steady state probe condition is satisfied.

The term "fault inducement action definition" refers to one or more data fields of a load testing experiment definition data object that define one or more fault inducement execution parameters of a fault inducement action (i.e., a related set of fault inducement action operations). While various embodiments of the present invention describe a load testing experiment definition data object that is associated with a single fault inducement action definition, a person of ordinary skill in the relevant technology will recognize that a load testing experiment may include two or more fault inducement actions, which may in turn lead to generating a load testing experiment definition data object that includes two or more fault inducement action definitions corresponding to the two or more fault inducement actions. For example, if a load testing experiment includes a first fault inducement action that corresponds to stopping a particular instance of a target software application framework and a second fault inducement action that corresponds to increasing system CPU pressure on the target software application framework, then the load experiment definition data object that corresponds to the described load testing experiment may include two fault inducement action definitions: a first load fault inducement definition corresponding to the first fault inducement action and a second load fault inducement definition corresponding to the second fault inducement action.

The term "fault inducement execution parameter" refers to a data entity that is generated by a client computing device and transmitted to a load testing experiment server computing device as part of a load experiment testing definition data object. The fault inducement execution parameter describes a defined property of a fault inducement action. Examples of fault inducement execution parameters include: a fault inducement execution parameter that defines an identifier of a fault inducement action, a fault inducement magnitude parameter that defines the type of a fault inducement action, a fault inducement parallel execution mode parameter that defines whether a fault inducement action should be performed in parallel or sequentially, a fault inducement execution parameter that defines where data used in a fault inducement action is retrieved from, a fault inducement execution parameter that defines whether retrieval of data used in a fault inducement action is performed in parallel or sequentially, and/or the like. A fault inducement execution parameter may correspond to a data field of a load experiment definition data object that describes a property of a fault inducement action that is a stage of the load testing experiment associated with the load testing experiment definition data object, as opposed to a property of a steady state probe action that is a stage of the load testing experiment associated with the load testing experiment definition data object or a property of a load increase action probe that is a stage of the load testing experiment associated with the load testing experiment definition data object.

The term "fault inducement halt condition" refers to a data entity that is generated by a load testing experiment server computing device based on at least one of experiment configuration metadata maintained in a storage subsystem of the load testing experiment server computing device or a load experiment testing definition data object. The fault inducement halt condition describes a condition of a target software application framework whose satisfaction is monitored in response to (e.g., during) execution of a halt inducement action with respect to the target software application framework. When a fault inducement halt condition is satisfied, a corresponding halt inducement action is terminated. Examples of fault inducement halt conditions include network-activity-based conditions, memory-usage-based conditions, processor-usage-based conditions, storage-usage-based conditions, and/or the like. In some embodiments, a fault inducement halt condition is determined based on a steady state probe condition. For example, a fault inducement halt condition is characterized by failure of the target software application framework to satisfy at least one of the one or more steady state probe conditions during the execution of the one or more fault inducement operations. In some embodiments, a fault inducement halt condition is characterized by a fault duration parameter defined by the fault inducement action definition that defines a maximum period of performing a fault inducement action. For example, a fault inducement halt condition may require that a fault inducement action is stopped after one minute. In some embodiments, a fault inducement halt condition is characterized by a software breakdown parameter defined by the fault inducement action definition. For example, a fault inducement halt condition may require that a fault inducement action is stopped after a target software application framework reaches a system condition deemed to indicate sufficient proximity to a likely system breakdown.

The term "predicted software resilience signature" refers to a data entity that is generated by a load testing experiment server computing device based on a current operational state of a target software application framework after detecting satisfaction of a fault inducement halt condition. The predicted software resilience signature describes response of the target software application framework to one or more fault inducement actions associated with a load testing experiment. The predicted software resilience signature may also describe response of the target software application framework to one or more load increase actions associated with the load testing experiment. The predicted software resilience signature may be a detailed operational report, a weakness assessment report, an operational assessment report, and/or the like.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
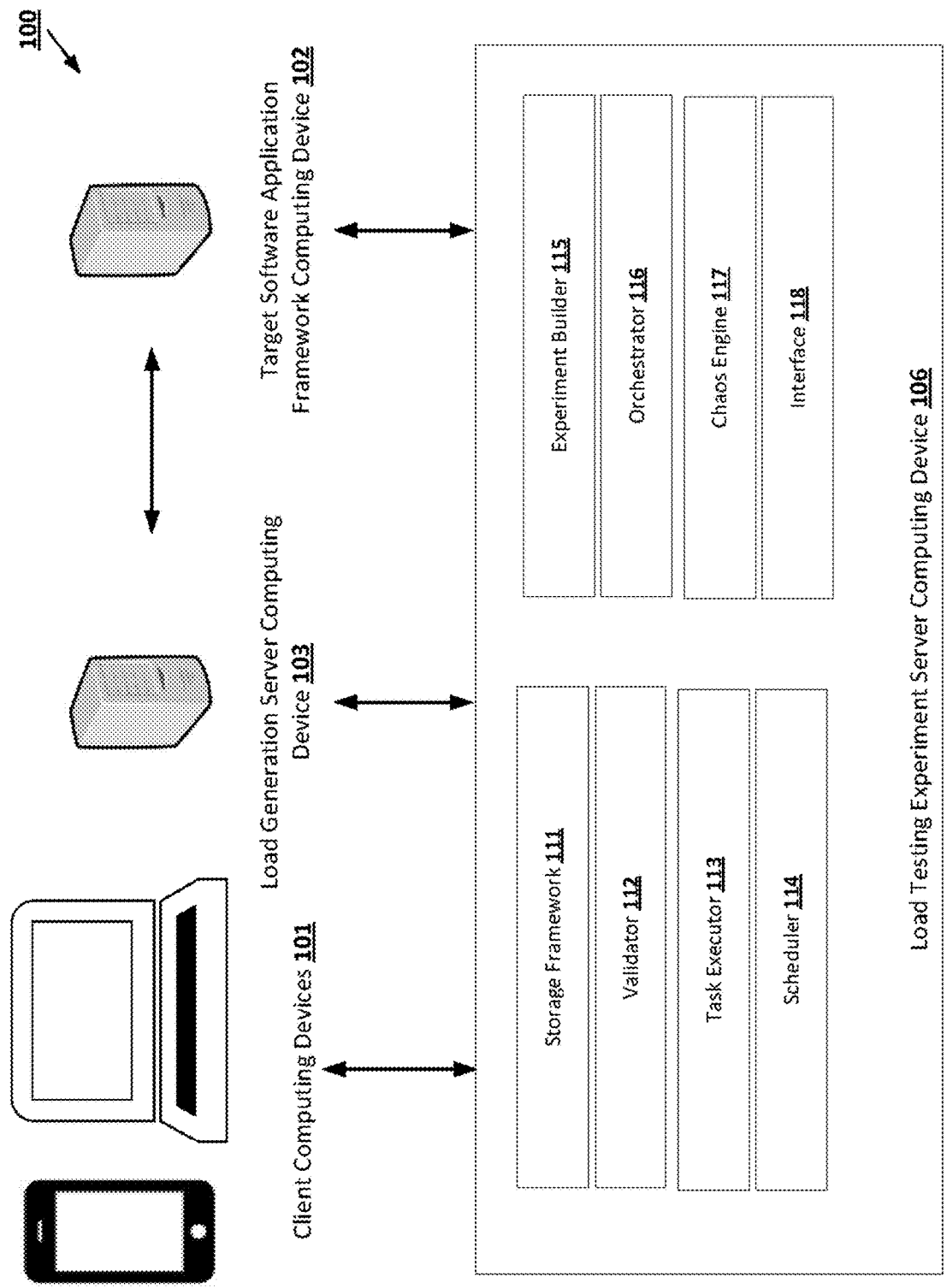
FIG. 1 is a block diagram of an example architecture within which at least some embodiments of the present invention may operate.

FIG. 1 depicts an exemplary architecture 100 for performing proactive monitoring of a target software application framework The architecture 100 includes one or more client computing devices 101, a load generation server computing device 103, a target software application framework computing deice 102, and a load testing experiment server computing device 106.

The client computing device 101 is configured to generate a load testing experiment request with respect to a target software application framework computing device 102 and transmit the load testing experiment request to the load testing experiment server computing device 106. In some embodiments, the load testing experiment may describe at least some of the data associated with a load testing experiment definition data object, as further described below.

The target software application framework computing device 102 is configured to act as an access interface for a target software application framework and enable modifications to the software configuration data associated with the target software application framework. In some embodiments, the target software application framework computing device 102 is configured to enable access to a cloud-based software server associated with the target software application framework, such as the Amazon Web Services (AWS) server or the Microsoft Azure server. In some embodiments, the target software application framework computing device 102 is configured to enable access to a systems manager agent (SSM) associated with the target software application framework. In some embodiments, the target software application framework computing device 102 is configured to enable access to a platform sidecar associated with the target software application framework.

The load generation server computing device 103 is configured to generate user access load with respect to the target software application framework computing device 102. In some embodiments, the load testing experiment server computing device 106 transmits a load action increase request to the load generation server computing device 103, where the load increase request causes the load generation server computing device 103 to perform the load increase action operations by transmitting user activity data to the target software application framework computing device 102. An example of a load generation server computing device 103 is a PerfHammer server computing device.

The load testing experiment server computing device 106 is configured to perform proactive monitoring of the target software application monitoring framework. The load testing experiment server computing device 106 includes a storage framework 111, a validator 112, a task executor 113, a scheduler 114, an orchestrator 116, an experiment builder 115, a chaos engine 117, and an interface 118.

The storage framework 111 is configured to store data utilized by the load testing experiment server computing device 106 to perform proactive monitoring computing device. Examples of such data include halt inducement condition data, data describing one or more static operational properties of the target software application framework, and model definition data associated with one or more data analysis models utilized by the load testing experiment server computing device 106 to perform proactive monitoring of the target software application framework. The storage framework 111 may further store experiment data during the execution of a load testing experiment and/or monitoring data generated by the orchestrator 116 during the execution of a load testing experiment.

The validator 112 is configured to determine whether the load testing experiment request transmitted by the client computing device 101 includes required data fields (e.g., required data fields defined by the schema of a load experiment definition data object for a load testing experiment). In response to determining that the load testing experiment request transmitted by the client computing device 101 does not include the required data fields, the validator 112 may reject the load testing experiment by transmitting a load testing rejection notification to the client computing device 101. In response to determining that the load testing experiment request transmitted by the client computing device 101 includes the required data fields, the validator 112 may transmit a load testing experiment definition data object corresponding to the load testing experiment request to the task executor 113.

The task executor 113 is configured to determine, based on a load testing experiment definition data object, whether the load testing experiment corresponding to the load testing experiment definition data object should be performed on-demand or in a scheduled manner at a later time. If the task executor 113 determines that the load testing experiment definition data object should be performed on-demand, the task executor 113 provides the load testing experiment definition data object to the orchestrator 116. If the task executor 113 determines that the load testing experiment definition data object should be performed in a scheduled manner at a later time, the task executor 113 provides the load testing experiment definition data object to scheduler 114.

The scheduler 114 is configured to determine a scheduled execution time of a load testing experiment based on a corresponding load testing experiment definition data object. The scheduler 114 is further configured to, at the scheduled execution time, provide the load testing experiment definition data object to the task executor 113. In some embodiments, the scheduler 114 is a Quartz scheduler.

The orchestrator 116 is configured to define the workflow of a load testing experiment corresponding to a load testing experiment definition data object. In particular, the orchestrator is configured to: (i) cause the experiment builder 115 to retrieve experiment definition metadata and generate the load testing experiment based on the experiment definition metadata and the load testing experiment definition data object, (ii) cause the load generation server computing device 103 to perform load increase actions corresponding to the load texting experiment, (iii) monitor the load generation server computing device 103 to determine whether the target software application framework under the load testing experiment has satisfied steady state probe conditions, and (iv) cause the chaos engine 117 to perform fault inducement actions associated with a load testing experiment and to perform any rollback operations associated with the load testing experiment.

The interface 118 is configured to receive a load testing experiment request from the client computing device 101, generate a predicted software resilience signature based on experiment output data, and provide the predicted software resilience signature to the client computing device 101 in response to the load testing experiment. In some embodiments, the interface 118 is a representation state transfer application programming interface (REST API). In some embodiments, the interface 118 comprises at least one of three interfaces: (i) a REST API, (ii) a command-line tool, and (iii) a user interface. In some embodiments, if an experiment fails due to a steady-state failure, specific action items will be raised against the target services. In some of the noted embodiments, it is the service owner's responsibility to address the action items and implement/fix the described issues.

Exemplary Load Testing Experiment Server Computing Device

Figure 2:
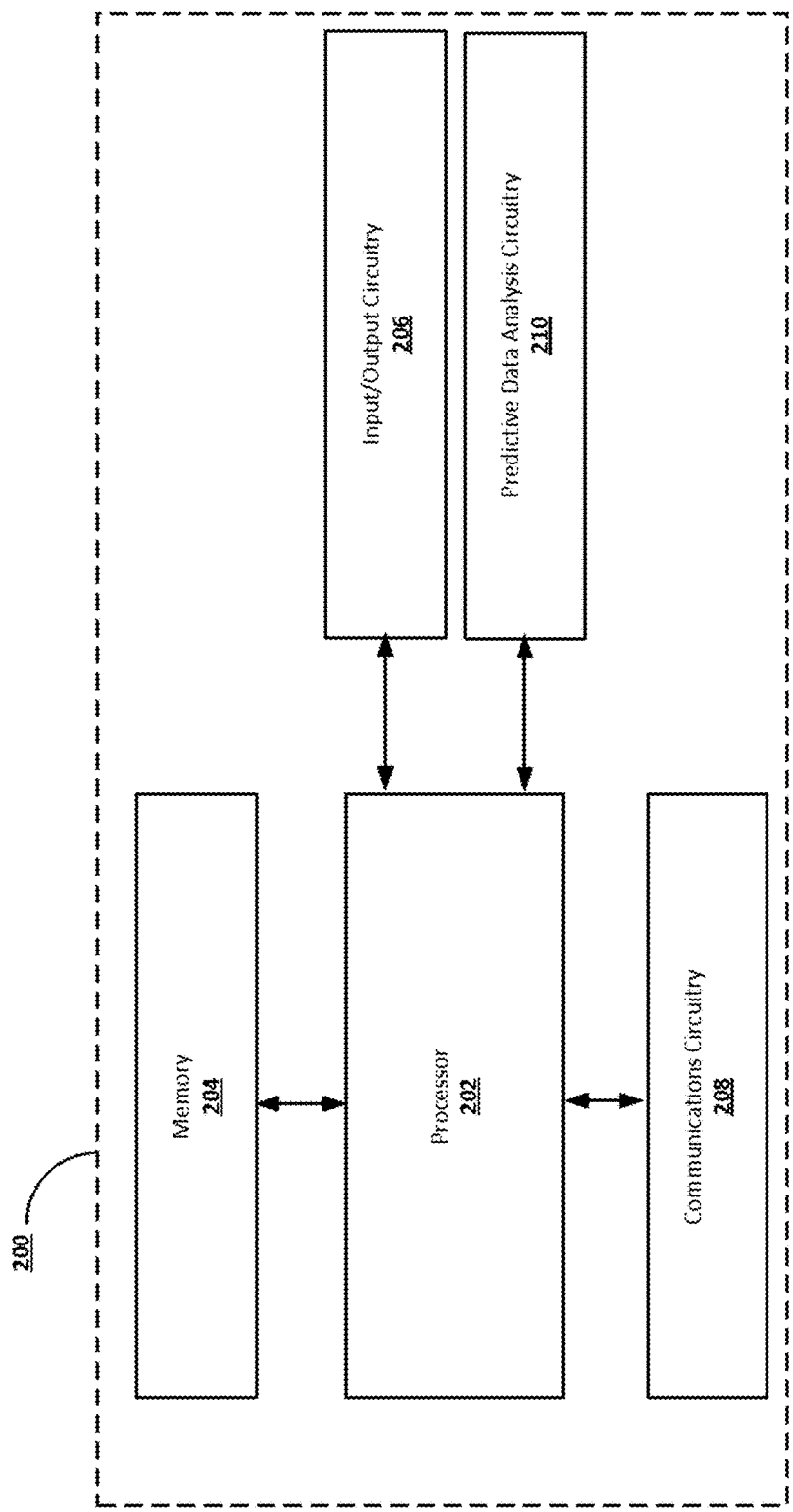
FIG. 2 is a block diagram of an example load testing experiment server computing device in accordance with at least some embodiments of the present invention.

The load testing experiment server computing device 106 may be embodied by one or more computing systems, such as apparatus 200 shown in FIG. 2. The apparatus 200 may include processor 202, memory 204, input/output circuitry 206, communications circuitry 208, and a predictive data analysis circuitry 210. The apparatus 200 may be configured to execute the operations described herein. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The predictive data analysis circuitry 210 may be any means such as a device or circuitry embodied in either hardware or a combination of hardware and software that is configured to perform predictive data analysis operations. For example, the predictive data analysis circuitry 210 may include specialized circuitry that are configured to perform machine learning operations in an expedited manner, such as graphical processing unit (GPU) circuitry and/or tensor processing unit (TPU) circuitry.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Computing Device

Figure 3:
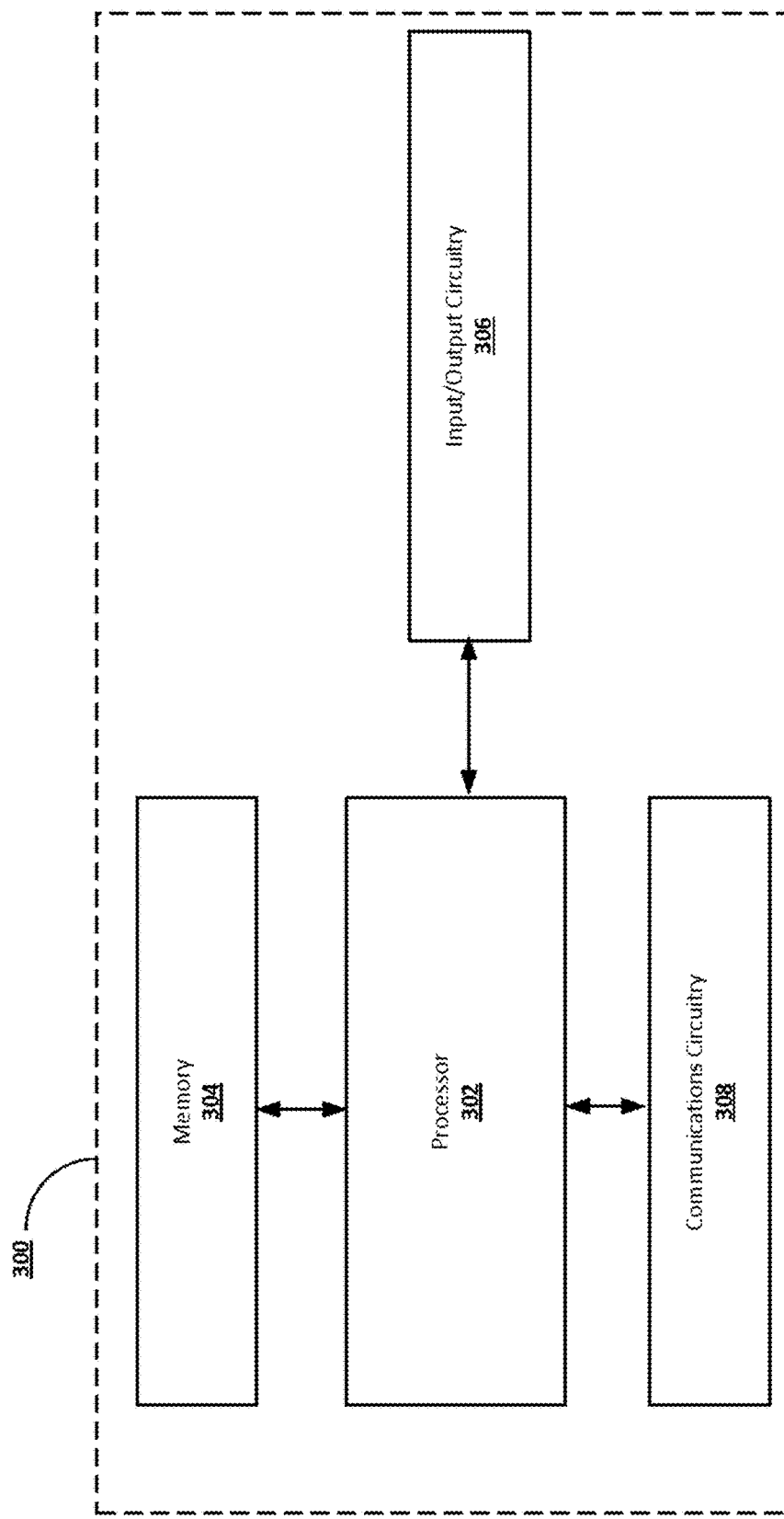
FIG. 3 is a block diagram of an example client computing device in accordance with at least some embodiments of the present invention.

Referring now to FIG. 3, a client computing device may be embodied by one or more computing systems, such as apparatus 300 shown in FIG. 3. The apparatus 300 may include processor 302, memory 304, input/output circuitry 306, and a communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 306 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Exemplary Load Generation Server Computing Device

Figure 4:
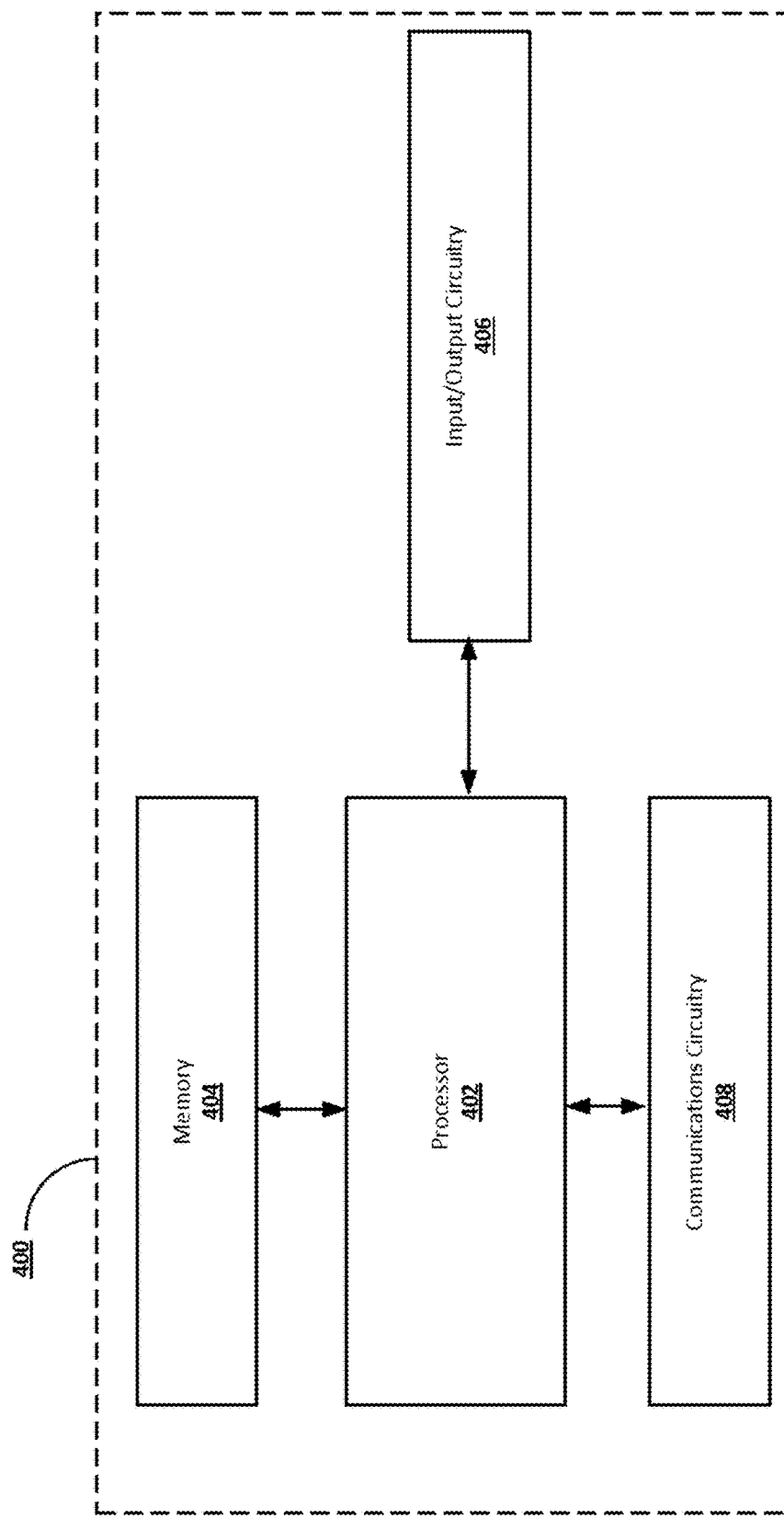
FIG. 4 is a block diagram of an example load generation server computing device in accordance with at least some embodiments of the present invention.

Referring now to FIG. 4, a load generation server computing device may be embodied by one or more computing systems, such as apparatus 400 shown in FIG. 4. The apparatus 400 may include processor 402, memory 404, input/output circuitry 406, and communications circuitry 408. Although these components 402-408 are described with respect to functional limitations, it should be understood that the particular implementations necessarily include the use of particular hardware. It should also be understood that certain of these components 402-408 may include similar or common hardware. For example, two sets of circuitries may both leverage use of the same processor, network interface, storage medium, or the like to perform their associated functions, such that duplicate hardware is not required for each set of circuitries.

In some embodiments, the processor 402 (and/or co-processor or any other processing circuitry assisting or otherwise associated with the processor) may be in communication with the memory 404 via a bus for passing information among components of the apparatus. The memory 404 is non-transitory and may include, for example, one or more volatile and/or non-volatile memories. In other words, for example, the memory 404 may be an electronic storage device (e.g., a computer-readable storage medium). The memory 404 may include one or more databases. Furthermore, the memory 404 may be configured to store information, data, content, applications, instructions, or the like for enabling the apparatus 400 to carry out various functions in accordance with example embodiments of the present invention.

The processor 402 may be embodied in a number of different ways and may, for example, include one or more processing devices configured to perform independently. In some preferred and non-limiting embodiments, the processor 402 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 402 may be configured to execute instructions stored in the memory 404 or otherwise accessible to the processor 402. In some preferred and non-limiting embodiments, the processor 402 may be configured to execute hard-coded functionalities. As such, whether configured by hardware or software methods, or by a combination thereof, the processor 402 may represent an entity (e.g., physically embodied in circuitry) capable of performing operations according to an embodiment of the present invention while configured accordingly. Alternatively, as another example, when the processor 402 is embodied as an executor of software instructions (e.g., computer program instructions), the instructions may specifically configure the processor 402 to perform the algorithms and/or operations described herein when the instructions are executed.

In some embodiments, the apparatus 400 may include input/output circuitry 406 that may, in turn, be in communication with processor 402 to provide output to the user and, in some embodiments, to receive an indication of a user input. The input/output circuitry 406 may comprise a user interface and may include a display, and may comprise a web user interface, a mobile application, a query-initiating computing device, a kiosk, or the like.

In embodiments in which the apparatus 400 is embodied by a limited interaction device, the input/output circuitry 406 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 406 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 404, and/or the like).

The communications circuitry 408 may be any means such as a device or circuitry embodied in either hardware or a combination of hardware and software that is configured to receive and/or transmit data from/to a network and/or any other device, circuitry, or module in communication with the apparatus 400. In this regard, the communications circuitry 408 may include, for example, a network interface for enabling communications with a wired or wireless communication network. For example, the communications circuitry 408 may include one or more network interface cards, antennae, buses, switches, routers, modems, and supporting hardware and/or software, or any other device suitable for enabling communications via a network. Additionally or alternatively, the communications circuitry 408 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 400. In some embodiments, one or more external systems (such as a remote cloud computing and/or data storage system) may also be leveraged to provide at least some of the functionality discussed herein.

Exemplary Target Software Application Framework Computing Device

Figure 5:
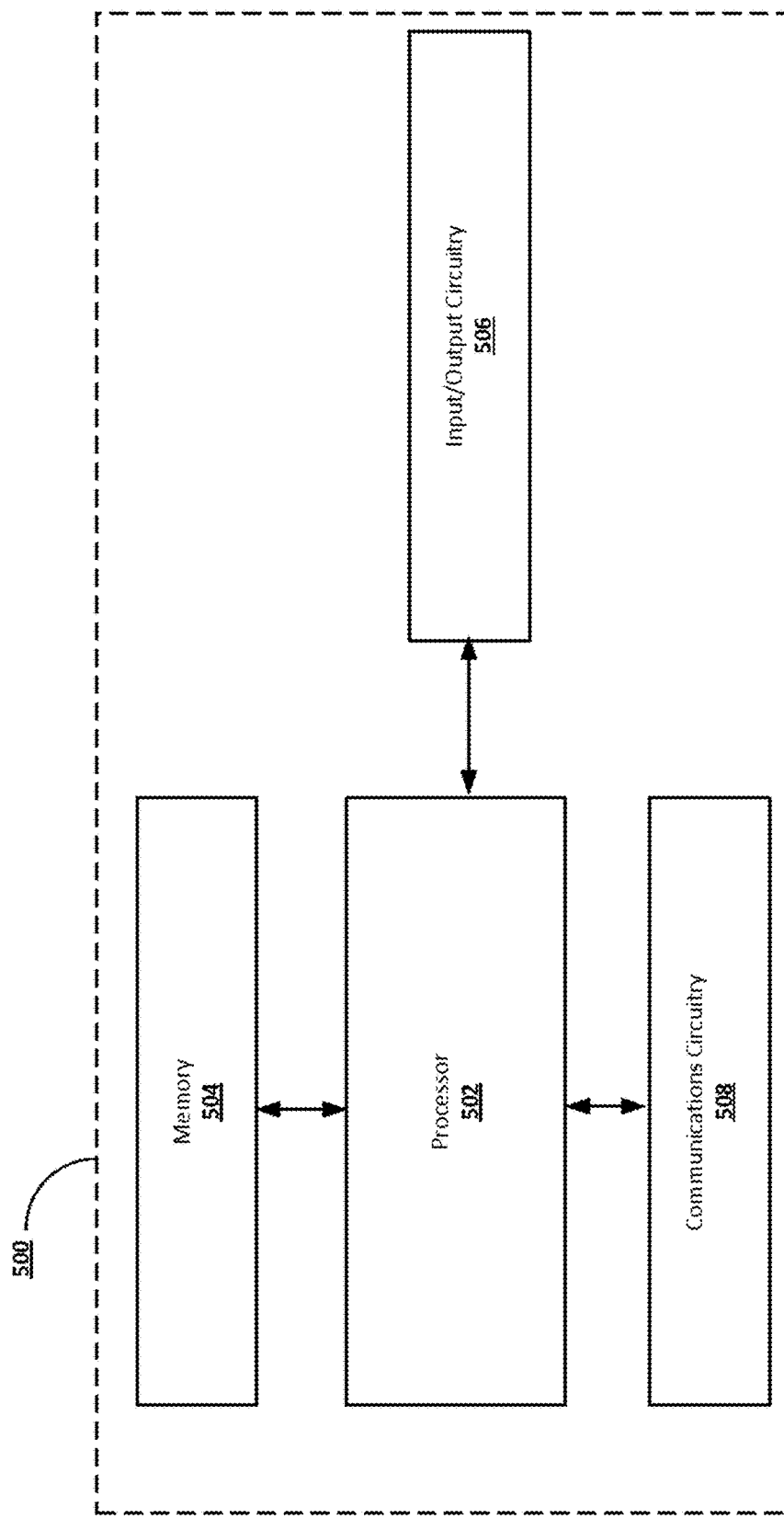
FIG. 5 is a block diagram of an example target software application framework computing device in accordance with at least some embodiments of the present invention.

Referring now to FIG. 5, a target software application framework computing device may be embodied by one or more computing systems, such as apparatus 500 shown in FIG. 5. The apparatus 500 may include processor 502, memory 504, input/output circuitry 506, and communications circuitry 508. Although these components 502-508 are described with respect to functional limitations, it should be understood that the particular implementations necessarily include the use of particular hardware. It should also be understood that certain of these components 502-508 may include similar or common hardware. For example, two sets of circuitries may both leverage use of the same processor, network interface, storage medium, or the like to perform their associated functions, such that duplicate hardware is not required for each set of circuitries.

In some embodiments, the processor 502 (and/or co-processor or any other processing circuitry assisting or otherwise associated with the processor) may be in communication with the memory 504 via a bus for passing information among components of the apparatus. The memory 504 is non-transitory and may include, for example, one or more volatile and/or non-volatile memories. In other words, for example, the memory 504 may be an electronic storage device (e.g., a computer-readable storage medium). The memory 504 may include one or more databases. Furthermore, the memory 504 may be configured to store information, data, content, applications, instructions, or the like for enabling the apparatus 500 to carry out various functions in accordance with example embodiments of the present invention.

The processor 502 may be embodied in a number of different ways and may, for example, include one or more processing devices configured to perform independently. In some preferred and non-limiting embodiments, the processor 502 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 502 may be configured to execute instructions stored in the memory 504 or otherwise accessible to the processor 502. In some preferred and non-limiting embodiments, the processor 502 may be configured to execute hard-coded functionalities. As such, whether configured by hardware or software methods, or by a combination thereof, the processor 502 may represent an entity (e.g., physically embodied in circuitry) capable of performing operations according to an embodiment of the present invention while configured accordingly. Alternatively, as another example, when the processor 502 is embodied as an executor of software instructions (e.g., computer program instructions), the instructions may specifically configure the processor 502 to perform the algorithms and/or operations described herein when the instructions are executed.

In some embodiments, the apparatus 500 may include input/output circuitry 506 that may, in turn, be in communication with processor 502 to provide output to the user and, in some embodiments, to receive an indication of a user input. The input/output circuitry 506 may comprise a user interface and may include a display, and may comprise a web user interface, a mobile application, a query-initiating computing device, a kiosk, or the like.

In embodiments in which the apparatus 500 is embodied by a limited interaction device, the input/output circuitry 506 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 506 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 504, and/or the like).

The communications circuitry 508 may be any means such as a device or circuitry embodied in either hardware or a combination of hardware and software that is configured to receive and/or transmit data from/to a network and/or any other device, circuitry, or module in communication with the apparatus 500. In this regard, the communications circuitry 508 may include, for example, a network interface for enabling communications with a wired or wireless communication network. For example, the communications circuitry 508 may include one or more network interface cards, antennae, buses, switches, routers, modems, and supporting hardware and/or software, or any other device suitable for enabling communications via a network. Additionally or alternatively, the communications circuitry 508 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 500. In some embodiments, one or more external systems (such as a remote cloud computing and/or data storage system) may also be leveraged to provide at least some of the functionality discussed herein.

Example Data Flows and Operations

Figure 6:
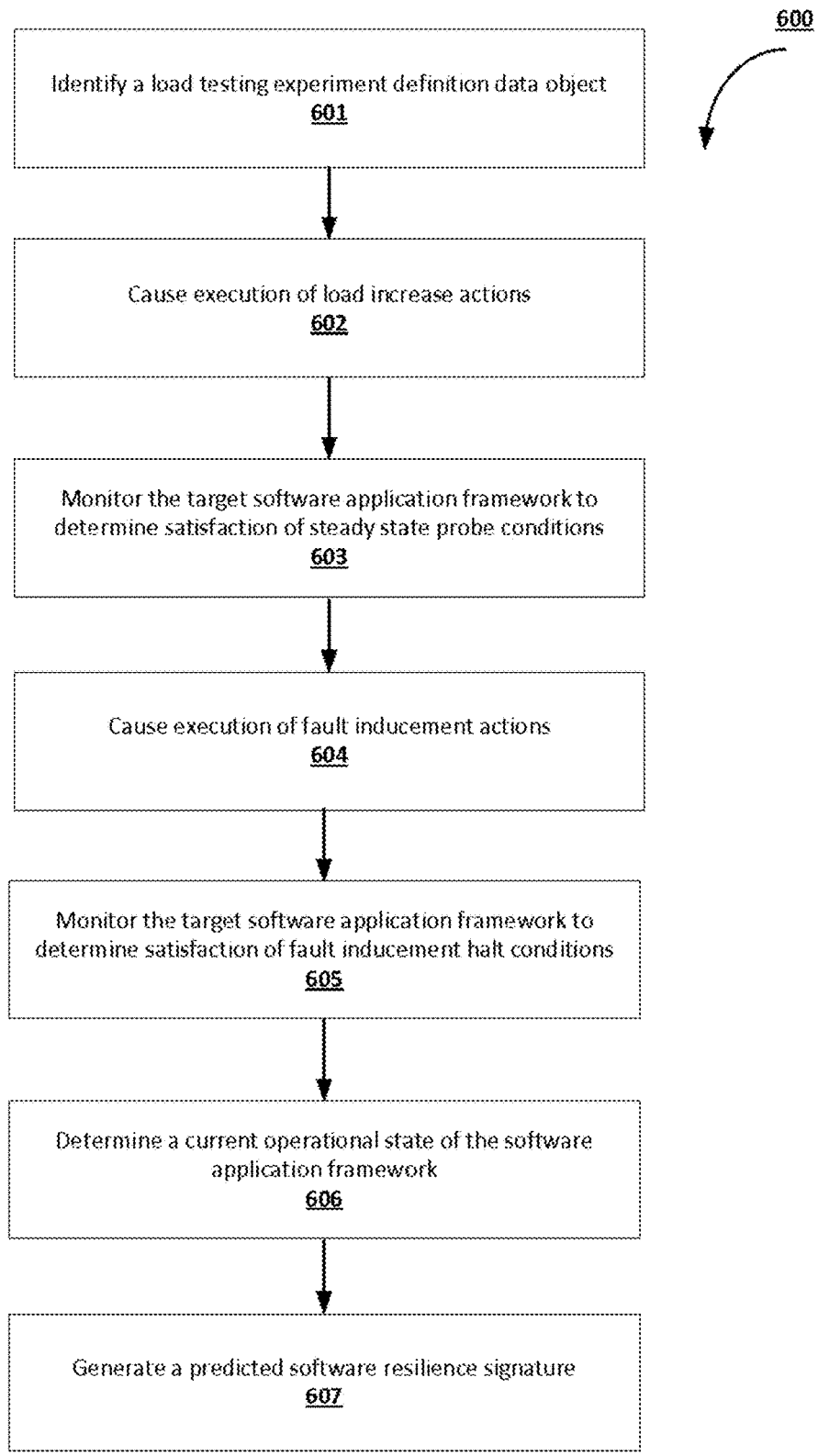
FIG. 6 is a flowchart diagram of an example process for proactive monitoring of a software application framework in accordance with at least some embodiments of the present invention.

FIG. 6 is a flowchart diagram of an example process 600 for proactive monitoring of a target software application framework. Via the various operations of the process 600, the load testing experiment server computing device 106 can efficiently and effectively perform load testing experiments that are configured to assess the resilience of a target software application framework hosted by the target software application framework computing device 102 when faced with infusion of predefined fault conditions given predefined user load conditions.

The process 600 begins at operation 601 when the load testing experiment server computing device 106 identifies a load testing experiment definition data object. For example, the load testing experiment server computing device 106 may receive the load testing experiment definition data object from the client computing device 101 and/or may generate the load testing experiment definition based on input data provided to the load testing experiment server computing device 106 by the client computing device 101.

The load testing experiment definition data object describes one or more requested experiment properties of a load testing experiment that an end user of the client computing device 101 requests be performed with respect to the target software application framework. The requested experiment properties described by a load testing experiment definition data object include a load increase action definition, a steady state definition, and a fault inducement action definition. In some embodiments, a load testing experiment definition data object includes at least one of the following: one or more experiment runtime configuration properties of the requested load testing experiment that describe whether the requested load testing experiment should be performed on-demand or in a prescheduled fashion, and one or more experiment pre-condition properties of the requested load testing experiment that describe one or more pre-conditions (e.g., one or more usage-load-based pre-conditions) that should be present before performing the requested load testing experiment. In some embodiments, causing the execution of the one or more load increase action operations comprises causing a load generation server to perform a simulated usage load scenario with respect to the target software application framework.

FIGS. 9A-H depict operational examples of various load experiment definition data objects. FIG. 9A depicts a load experiment definition data object 901 that describes a load testing experiment defined by: (i) one or more load increase operations, and (ii) the following fault inducement halt conditions: a CPU increase of 60 percent for a fault duration of 300 seconds. As depicted in FIG. 9A, the load experiment definition data object 901 includes the load increase action definition 911, the fault inducement action definition 912, and the steady state definition 913. As further depicted in FIG. 9A, the load increase action definition 911 includes the load increase execution parameter 914 defining the magnitude of the corresponding load increase action. As further depicted in FIG. 9A, the fault inducement action definition 912 defines the following fault inducement execution parameters: a fault category 915, a fault action type 916, and a fault container 917. As further depicted in FIG. 9A, the fault inducement action definition 912 defines the following fault inducement halt conditions: a fault inducement halt condition defined by a fault percentage 918 and a fault inducement halt condition defined by a fault duration 919. As further depicted in FIG. 9A, the steady state definition 913 defines the following steady state probe condition: a steady state probe condition characterized by the probe category 920, the probe action type 921, the probe metric 922, and the probe threshold 923.

FIG. 9B depicts a load experiment definition data object 902 that describes a load testing experiment defined by: (i) one or more load increase operations, and (ii) the following fault inducement halt conditions: a memory increase of 60 percent for a fault duration of 300 seconds. As depicted in FIG. 9B, the load experiment definition data object 902 includes the load increase action definition 924, the fault inducement action definition 925, and the steady state definition 926. As further depicted in FIG. 9B, the load increase action definition 924 includes the load increase execution parameter 927 defining the magnitude of the corresponding load increase action. As further depicted in FIG. 9B, the fault inducement action definition 925 defines the following fault inducement execution parameters: a fault category 928, a fault action type 929, and a fault container 930. As further depicted in FIG. 9B, the fault inducement action definition 925 defines the following fault inducement halt conditions: a fault inducement halt condition defined by a fault percentage 931 and a fault inducement halt condition defined by a fault duration 932. As further depicted in FIG. 9B, the steady state definition 926 defines the following steady state probe condition: a steady state probe condition characterized by the probe category 9931, the probe action type 9932, the probe metric 933, and the probe threshold 934.

FIG. 9C depicts a load experiment definition data object 903 that describes a load testing experiment defined by: (i) one or more load increase operations, and (ii) the following fault inducement halt conditions: a network delay of 1000 milliseconds for a fault duration of 300 seconds. As depicted in FIG. 9C, the load experiment definition data object 903 includes the load increase action definition 935, the fault inducement action definition 936, and the steady state definition 937. As further depicted in FIG. 9C, the load increase action definition 935 includes the load increase execution parameter 938 defining the magnitude of the corresponding load increase action. As further depicted in FIG. 9C, the fault inducement action definition 936 defines the following fault inducement execution parameters: a fault category 939, a fault action type 940, and a fault container 941. As further depicted in FIG. 9C, the fault inducement action definition 936 defines the following fault inducement halt conditions: a fault inducement halt condition defined by a fault percentage 942 and a fault inducement halt condition defined by a fault duration 943. As further depicted in FIG. 9C, the steady state definition 937 defines the following steady state probe condition: a first steady state probe condition characterized by the probe category 944, the probe action type 945, the probe metric 946, and the probe threshold 947; and a second steady state probe condition characterized by the probe category 948, the probe action type 949, the probe metric 950, and the probe threshold 951.

FIG. 9D depicts a load experiment definition data object 904 that describes a load testing experiment defined by: (i) one or more load increase operations, and (ii) the following fault inducement halt conditions: an input/output (IO) increase of 70 percent for a fault duration of 300 seconds. As depicted in FIG. 9D, the load experiment definition data object 904 includes the load increase action definition 952, the fault inducement action definition 953, and the steady state definition 954. As further depicted in FIG. 9D, the load increase action definition 952 includes the load increase execution parameter 955 defining the magnitude of the corresponding load increase action. As further depicted in FIG. 9D, the fault inducement action definition 953 defines the following fault inducement execution parameters: a fault category 956, a fault action type 957, and a fault container 958. As further depicted in FIG. 9D, the fault inducement action definition 953 defines the following fault inducement halt conditions: a fault inducement halt condition defined by a fault percentage 959 and a fault inducement halt condition defined by a fault duration 960. As further depicted in FIG. 9D, the steady state definition 954 defines the following steady state probe condition: a steady state probe condition characterized by the probe category 961, the probe action type 962, the probe metric 963, and the probe threshold 964.

FIG. 9E depicts a load experiment definition data object 905 that describes a load testing experiment defined by: (i) one or more load increase operations, and (ii) the following fault inducement halt conditions: a disk fill increase of 70 percent for a fault duration of 300 seconds. As depicted in FIG. 9E, the load experiment definition data object 905 includes the load increase action definition 966, the fault inducement action definition 967, and the steady state definition 968. As further depicted in FIG. 9E, the load increase action definition 966 includes the load increase execution parameter 969 defining the magnitude of the corresponding load increase action. As further depicted in FIG. 9E, the fault inducement action definition 967 defines the following fault inducement execution parameters: a fault category 970, a fault action type 971, and a fault container 972. As further depicted in FIG. 9E, the fault inducement action definition 967 defines the following fault inducement halt conditions: a fault inducement halt condition defined by a fault percentage 973 and a fault inducement halt condition defined by a fault duration 974. As further depicted in FIG. 9E, the steady state definition 968 defines the following steady state probe condition: a steady state probe condition characterized by the probe category 975, the probe action type 976, the probe metric 977, and the probe threshold 978.

FIG. 9F depicts a load experiment definition data object 906 that describes a load testing experiment defined by: (i) one or more load increase operations, (ii) multiple sets of steady state probe conditions each defining a separate steady state condition, and (iii) the following fault inducement halt conditions: an instance termination fault with a blast radius of 25 percent for a fault duration of 300 seconds. As depicted in FIG. 9F, the load experiment definition data object 906 includes the load increase action definition 979, the fault inducement action definition 980, and the steady state definition 981. As further depicted in FIG. 9F, the load increase action definition 979 includes the load increase execution parameter 982 defining the magnitude of the corresponding load increase action. As further depicted in FIG. 9F, the fault inducement action definition 980 defines the following fault inducement execution parameters: a fault category 983, a fault action type 984, and a fault container 985. As further depicted in FIG. 9F, the fault inducement action definition 980 defines the following fault inducement halt conditions: a fault inducement halt condition defined by a fault percentage 986 and a fault inducement halt condition defined by a fault duration 987. As further depicted in FIG. 9F, the steady state definition 981 defines the following steady state probe condition: a first steady state probe condition characterized by the probe category 988, the probe action type 989, the probe metric 990, and the probe threshold 991; and a second steady state probe condition characterized by the probe category 992, the probe action type 993, the probe metric 994, and the probe threshold 995.

FIG. 9G depicts a load experiment definition data object 908 that describes a load testing experiment defined by the following fault inducement halt conditions: a CPU increase of 60 percent for a fault duration of 300 seconds. As depicted in FIG. 9G, the load experiment definition data object 907 includes the fault inducement action definition 996 and the steady state definition 997. As further depicted in FIG. 9G, the fault inducement action definition 996 defines the following fault inducement execution parameters: a fault category 998, a fault action type 999, and a fault container 9001. As further depicted in FIG. 9G, the fault inducement action definition 996 defines the following fault inducement halt conditions: a fault inducement halt condition defined by a fault percentage 9002 and a fault inducement halt condition defined by a fault duration 9003. As further depicted in FIG. 9G, the steady state definition 997 defines the following steady state probe condition: a steady state probe condition characterized by the probe category 9004, the probe action type 9005, the probe metric 9006, and the probe threshold 9007.

Returning to the operational flow diagram of FIG. 6, at operation 602, the load testing experiment server computing device 106 causes execution of one or more load increase operations with respect to the target software application framework, where the one or more load increase operations satisfy one or more load increase execution parameters described by the load increase definition. In some embodiments, the load testing experiment server computing device 106 transmits a load action increase request to the load generation server computing device 103, where the load increase request causes the load generation server computing device 103 to perform the load increase action operations by transmitting user activity data to the target software application framework computing device 102. In some embodiments, the load action increase request is determined based on the load increase definition of the load experiment definition data object.

In some embodiments, the load increase action definition defines one or more load increase execution parameters of a load increase action (i.e., a related set of load increase operations). While various embodiments of the present invention describe a load testing experiment definition data object that is associated with a single load increase action definition, a person of ordinary skill in the relevant technology will recognize that a load testing experiment may include two or more load increase actions, which may in turn lead to generating a load testing experiment definition data object that includes two or more load increase action definitions corresponding to the two or more load increase actions. For example, if a load testing experiment includes increasing user activity by a first group of user profiles having a first access level to a first threshold amount as well as increasing user activity by a second group of user profiles having a second access level to a second threshold amount, then the load experiment definition data object that corresponds to the described load testing experiment may include two load increase action definitions: a first load increase action definition corresponding to the load increase action of increasing user activity by a first group of user profiles having a first access level to a first threshold amount and a second load increase action definition correspond to the load increase action of increasing user activity by a second group of user profiles having a second access level to a second threshold amount.

In some embodiments, a load increase execution parameter defined by a load increase action definition describes a defined property of a load increase action. Examples of load increase execution parameters include: a load increase execution parameter that defines an identifier of a load increase action, a load increase magnitude parameter that defines the required amount of user load for a load increase action, a load increase parallel execution mode parameter that defines whether a load increase action should be performed in parallel or sequentially, a load increase execution parameter that defines where user activity data used in a load increase action is retrieved from, a load increase execution parameter that defines whether retrieval of user activity data used in a load increase action is performed in parallel or sequentially, and/or the like. A load increase execution parameter may correspond to a data field of a load experiment definition data object that describes a property of a load increase action that is a stage of the load testing experiment associated with the load testing experiment definition data object, as opposed to a property of a steady state probe action that is a stage of the load testing experiment associated with the load testing experiment definition data object or a property of a fault inducement action probe that is a stage of the load testing experiment associated with the load testing experiment definition data object.

At operation 603, the load testing experiment server computing device 106 monitors the target software application framework in response to (e.g., during) the execution of the load increase action operations to determine whether one or more steady state probe conditions are satisfied. In some embodiments, in response to the execution of the load increase action operations, the load testing experiment server computing device 106 transmits one or more target software application monitoring requests (e.g., one or more SignalFx polls) to the target software application framework computing device 102, which in turn causes the target software application framework computing device 102 to generate target software application monitoring request responses (e.g., one or more SignalFx poll responses) that describe operational conditions of the target software application framework and transmit the target software application monitoring request responses to the load testing experiment server computing device 106. The steady state probe conditions are defined by a particular steady state definition.

In some embodiments, the steady state definition defines a related set of one or more steady state probe conditions. In response to (e.g., during) the execution of a load increase action with respect to a target software application framework associated with the load testing experiment definition data object, the target software application framework is monitored (i.e., probed) to determine whether the set of related steady state probe conditions associated with the load increase action are satisfied. In response to determining that the set of related steady state probe conditions are satisfied, a fault inducement action (i.e., a related set of fault inducement operations) associated with the load increase action is performed. Accordingly, while various embodiments of the present invention describe a load testing experiment definition data object that includes a single steady state definition, a person of ordinary skill in the relevant technology will recognize that a load testing experiment definition data object may describe two or more steady state probe conditions each associated with a load increase action of two or more load increase actions associated with the load testing experiment definition data object. For example, if a load testing experiment includes increasing user activity by a first group of user profiles having a first access level to a first threshold amount until a first network activity level is reached as well as increasing user activity by a second group of user profiles having a second access level to a second threshold amount until a second network activity level is reached, then the load experiment definition data object that corresponds to the described load testing experiment may include two steady state definitions: a first steady state definition that describes the first network activity level and a second steady state definition that describes the second network activity level.

In some embodiments, a steady state probe condition defined by a steady state definition describes a condition of a target software application framework whose satisfaction is monitored in response to (e.g., during) execution of a load increase action with respect to the target software application framework. Examples of steady state probe conditions include network-activity-based conditions, memory-usage-based conditions, processor-usage-based conditions, storage-usage-based conditions, and/or the like. In some embodiments, a steady state probe condition is defined by a corresponding load increase action definition data object. In some of the noted embodiments, the steady state probe condition is defined by the corresponding load increase action definition data object using a steady state probe action that describes the monitoring action that should be performed to determine whether the steady state probe condition is satisfied.

At operation 604, in response to determining that the target software application framework satisfies the one or more steady state probe conditions, the load testing experiment server computing device 106 causes execution of one or more fault inducement operations with respect to the target software application framework. In some embodiments, the load testing experiment server computing device 106 transmits one or more software configuration modification requests to the target software application framework computing device 102, where the software configuration modification requests causes target software application framework computing device 102 to modify execution of the operations associated with the target software application framework in a manner that is configured to cause the target software application framework to experience a requested/desired fault condition. The one or more fault inducement operations are defined by a fault inducement action definition.

In some embodiments, the fault inducement action definition defines one or more fault inducement execution parameters of a fault inducement action (i.e., a related set of fault inducement action operations). While various embodiments of the present invention describe a load testing experiment definition data object that is associated with a single fault inducement action definition, a person of ordinary skill in the relevant technology will recognize that a load testing experiment may include two or more fault inducement actions, which may in turn lead to generating a load testing experiment definition data object that includes two or more fault inducement action definitions corresponding to the two or more fault inducement actions. For example, if a load testing experiment includes a first fault inducement action that corresponds to stopping a particular instance of a target software application framework and a second fault inducement action that corresponds to increasing system CPU pressure on the target software application framework, then the load experiment definition data object that corresponds to the described load testing experiment may include two fault inducement action definitions: a first load fault inducement definition corresponding to the first fault inducement action and a second load fault inducement definition corresponding to the second fault inducement action.

In some embodiments, a fault inducement execution parameter defined by a fault inducement action definition describes a defined property of a fault inducement action. Examples of fault inducement execution parameters include: a fault inducement execution parameter that defines an identifier of a fault inducement action, a fault inducement magnitude parameter that defines the type of a fault inducement action, a fault inducement parallel execution mode parameter that defines whether a fault inducement action should be performed in parallel or sequentially, a fault inducement execution parameter that defines where data used in a fault inducement action is retrieved from, a fault inducement execution parameter that defines whether retrieval of data used in a fault inducement action is performed in parallel or sequentially, and/or the like. A fault inducement execution parameter may correspond to a data field of a load experiment definition data object that describes a property of a fault inducement action that is a stage of the load testing experiment associated with the load testing experiment definition data object, as opposed to a property of a steady state probe action that is a stage of the load testing experiment associated with the load testing experiment definition data object or a property of a load increase action probe that is a stage of the load testing experiment associated with the load testing experiment definition data object.

At operation 605, in response to (e.g., during) the execution of the one or more fault inducement operations, the load testing experiment server computing device 106 monitors the target software application framework to determine whether the target software application framework satisfies at least one of one or more fault inducement halt conditions. In some embodiments, in response to the execution of the halt inducement action operations, the load testing experiment server computing device 106 transmits one or more target software application monitoring requests (e.g., one or more SignalFx polls) to the target software application framework computing device 102, which in turn causes the target software application framework computing device 102 to generate target software application monitoring request responses (e.g., one or more SignalFx poll responses) that describe operational conditions of the target software application framework and transmit the target software application monitoring request responses to the load testing experiment server computing device 106.

The steady state probe conditions are defined by a steady state definition. Each fault inducement halt condition of the one or more fault inducement halt conditions is generated by the load testing experiment server computing device 106 based on at least one of experiment configuration metadata maintained in a storage framework 111 of the load testing experiment server computing device 106 or based on the corresponding load experiment testing definition data object.

In some embodiments, the fault inducement halt conditions include one or more of: (i) a fault inducement halt condition that is satisfied upon failure of the target software application framework to satisfy at least one of the one or more steady state probe conditions during the execution of the one or more fault inducement operations, (ii) fault duration parameter defined by the fault inducement action definition that is satisfied upon expiration of a maximum period of performing a fault inducement action, and (iii) a fault inducement halt condition that is satisfied when the target software application framework reaches a software breakdown condition by a software breakdown parameter defined by the noted fault inducement action definition.

In some embodiments, a fault inducement halt condition describes a condition of a target software application framework whose satisfaction is monitored in response to (e.g., during) execution of a halt inducement action with respect to the target software application framework. When a fault inducement halt condition is satisfied, a corresponding halt inducement action is terminated. Examples of fault inducement halt conditions include network-activity-based conditions, memory-usage-based conditions, processor-usage-based conditions, storage-usage-based conditions, and/or the like. In some embodiments, a fault inducement halt condition is determined based on a steady state probe condition. For example, a fault inducement halt condition is characterized by failure of the target software application framework to satisfy at least one of the one or more steady state probe conditions during the execution of the one or more fault inducement operations. In some embodiments, a fault inducement halt condition is characterized by a fault duration parameter defined by the fault inducement action definition that defines a maximum period of performing a fault inducement action. For example, a fault inducement halt condition may require that a fault inducement action is stopped after one minute. In some embodiments, a fault inducement halt condition is characterized by a software breakdown parameter defined by the fault inducement action definition. For example, a fault inducement halt condition may require that a fault inducement action is stopped after a target software application framework reaches a system condition deemed to indicate sufficient proximity to a likely system breakdown.

At operation 606, in response to determining that the target software application framework satisfies the one or more fault inducement halt conditions, the load testing experiment server computing device 106 determines a current operational state of the target software application framework. In some embodiments, in response to determining that the target software application framework satisfies the one or more fault inducement halt conditions, the load testing experiment server computing device 106 transmits one or more target software application monitoring requests (e.g., one or more SignalFx polls) to the target software application framework computing device 102, which in turn causes the target software application framework computing device 102 to generate target software application monitoring request responses (e.g., one or more SignalFx poll responses) that describe operational conditions of the target software application framework and transmit the target software application monitoring request responses to the load testing experiment server computing device 106.

The current operational condition may describe one or more conditions of the target software application framework, such as at least one of network-activity-based conditions, memory-usage-based conditions, processor-usage-based conditions, storage-usage-based conditions, and/or the like. In some embodiments, determining the current operational state of the target software application framework is performed based on one or more post-halt probing parameters defined by the fault inducement action definition that define one or more actions to monitor operational status of the target software application framework upon satisfaction of at least one fault inducement halt condition.

At operation 607, the load testing experiment server computing device 106 generates a predicted software resilience signature for the target software application framework based on the current operational state. In some embodiments, the predicted software resilience describes how the target software application framework responded to the load testing experiment. In some embodiments, in response to determining that the target software application framework satisfies the one or more fault inducement halt conditions, the load testing experiment server computing device 106 causes execution of one or more fault inducement halt operations, where the one or more fault inducement halt operations are configured to halt the execution of the one or more fault inducement operations, and further causes execution of one or more fault inducement rollback operations, where the one or more fault inducement halt operations are configured to roll back the execution of the one or more fault inducement operations.

In some embodiments, the predicted software resilience signature describes response of the target software application framework to one or more fault inducement actions associated with a load testing experiment. The predicted software resilience signature may also describe response of the target software application framework to one or more load increase actions associated with the load testing experiment. The predicted software resilience signature may be a detailed operational report, a weakness assessment report, an operational assessment report, and/or the like.

Figure 7A:
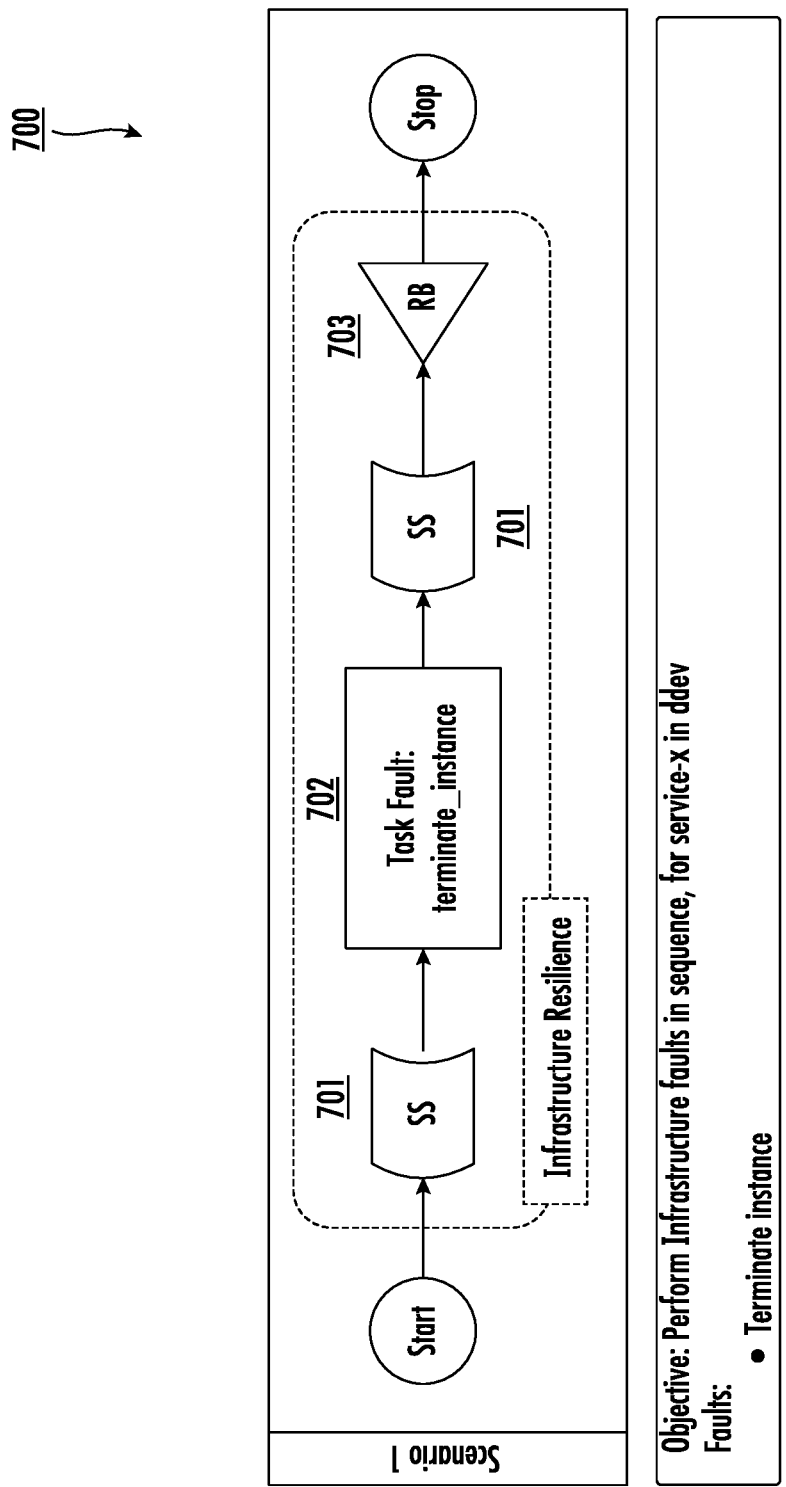

Operational examples of operational flow diagrams for four load testing experiments are depicted in FIGS. 7A-7D. As depicted in FIG. 7A, the load testing experiment 700 includes a steady state probe action that determines whether one or more steady state probe conditions 701 are satisfied, followed by a fault inducement action 702 that is terminated upon satisfaction of a fault inducement halt condition defined based on the steady state probe conditions 701, followed by a set of fault inducement rollback operations 703.

Figure 7B:
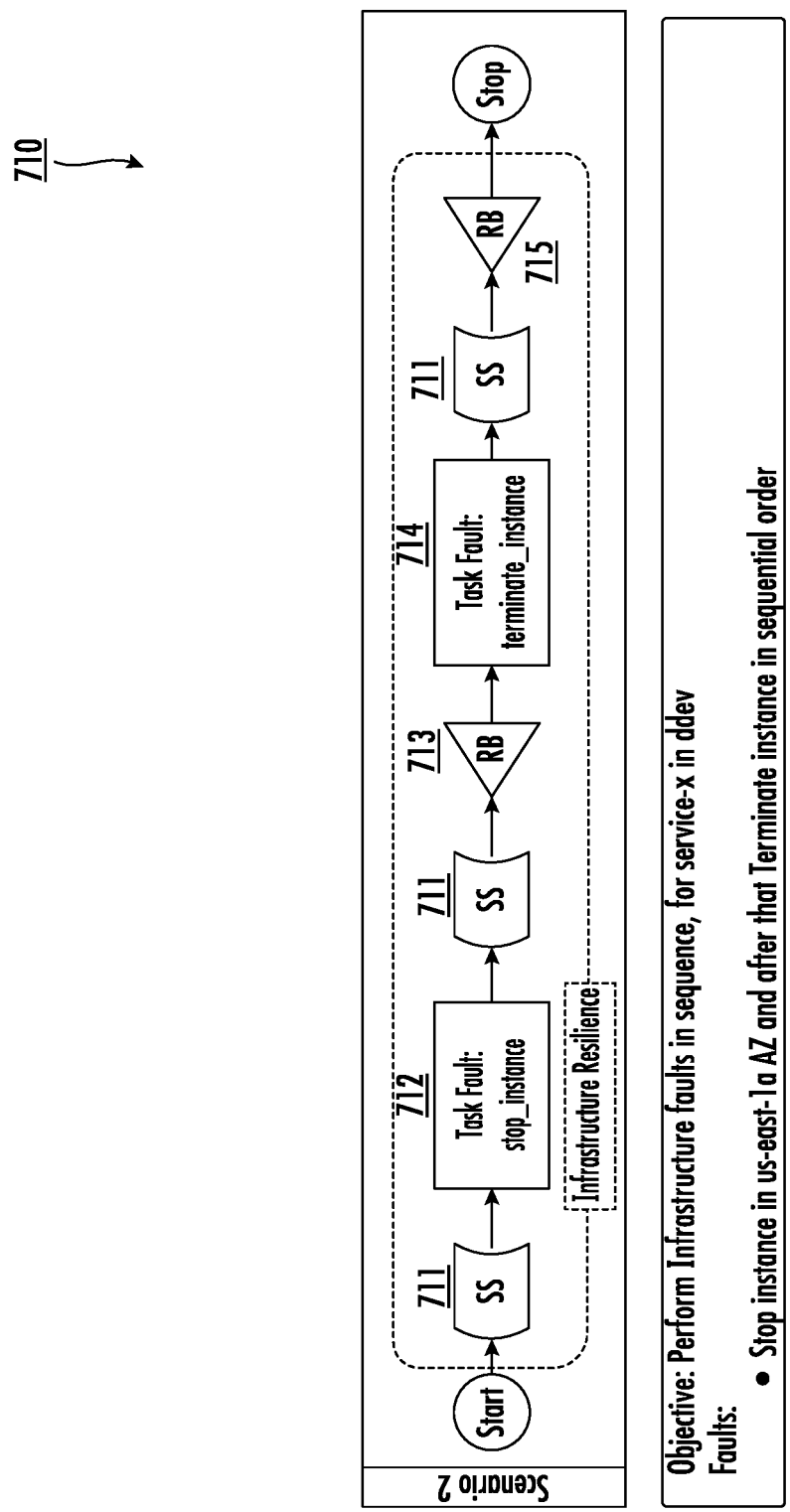

As depicted in FIG. 7B, the load testing experiment 710 includes a steady state probe action that determines whether one or more steady state probe conditions 711 are satisfied, followed by a first fault inducement action 712 that is terminated upon satisfaction of a fault inducement halt condition defined based on the steady state probe conditions 711, followed by a first set of fault inducement rollback operations 713, followed by a second fault inducement action 714 that that is terminated upon satisfaction of a fault inducement halt condition defined based on the steady state probe conditions 711, followed by a second set of fault inducement rollback operations 715.

Figure 7C:
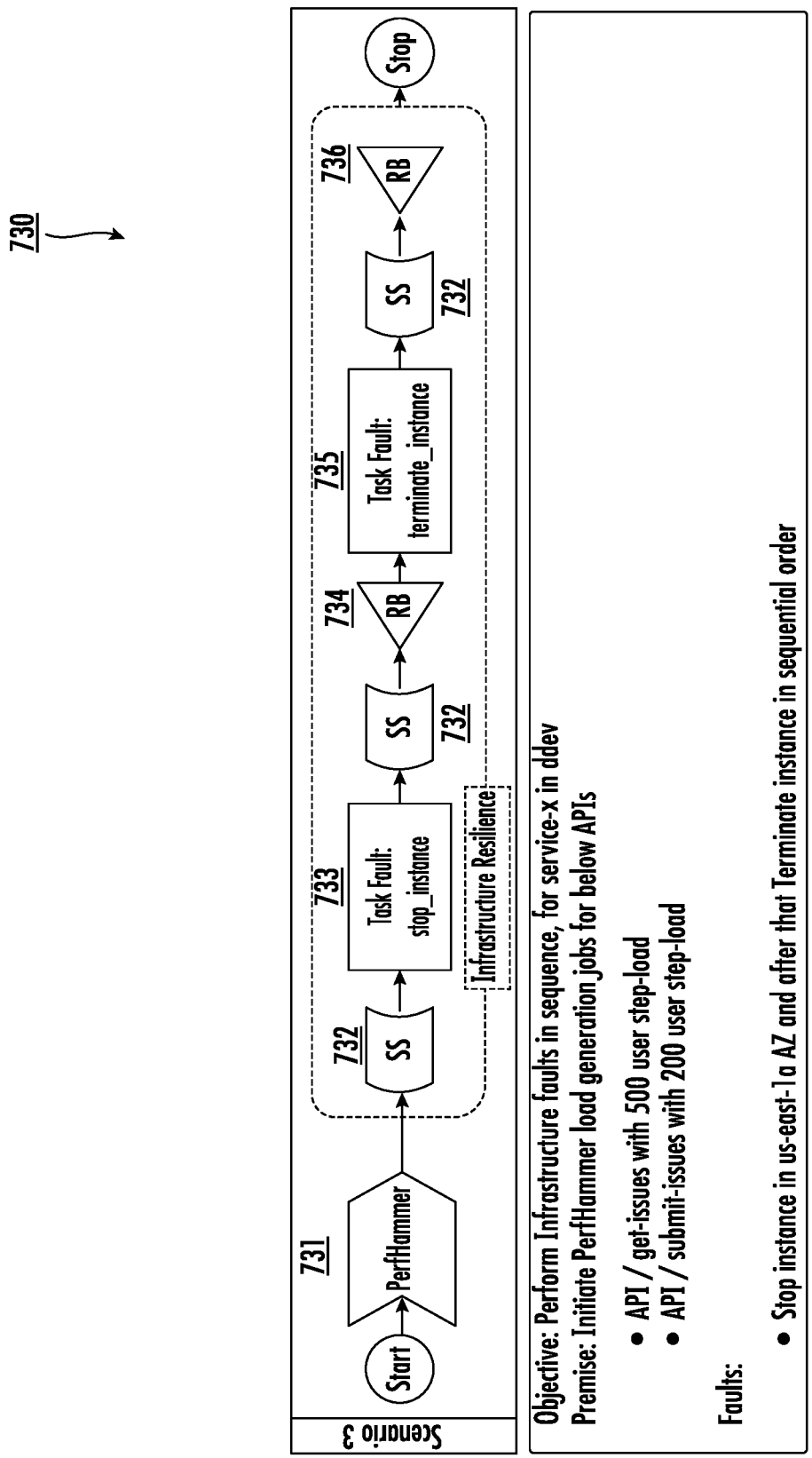

As depicted in FIG. 7C, the load testing experiment 730 includes a load increase action 731, followed by a steady state probe action that determines whether one or more steady state probe conditions 732 are satisfied, followed by a first fault inducement action 733 that is terminated upon satisfaction of a fault inducement halt condition defined based on the steady state probe conditions 732, followed by a first set of fault inducement rollback operations 734, followed by a second fault inducement action 735 that that is terminated upon satisfaction of a fault inducement halt condition defined based on the steady state probe conditions 732, followed by a second set of fault inducement rollback operations 736.

Figure 7D:
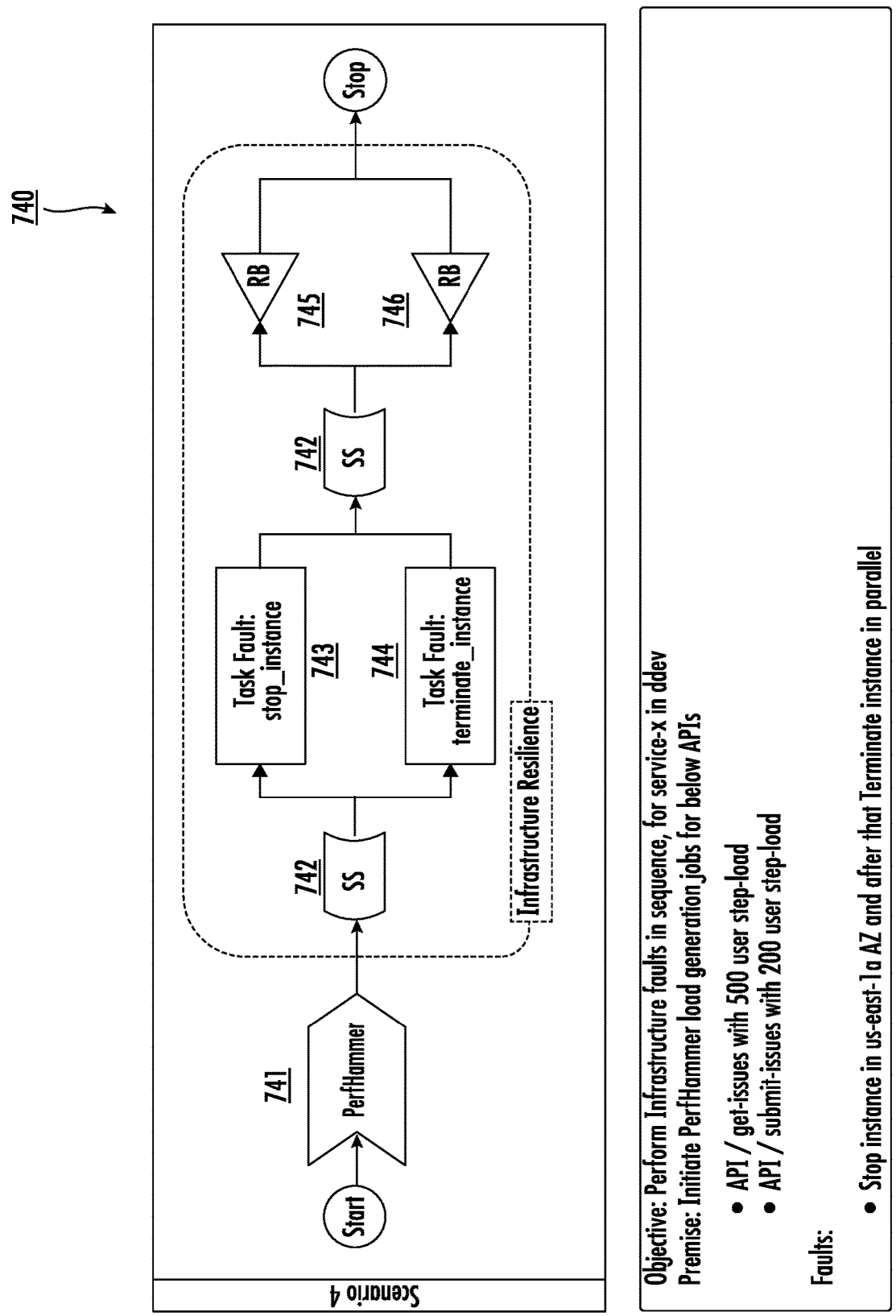

As depicted in FIG. 7D, the load testing experiment definition 740 includes a load increase action 741, followed by a steady state probe action that determines whether one or more steady state probe conditions 742 are satisfied, followed by parallel execution of two fault inducement actions 743-744 that is terminated upon satisfaction of a fault inducement condition defined based on the set of steady state prob conditions 742, followed by parallel execution of two fault inducement rollback operations 745-746 each associated with one of the two fault inducement actions 743-744.

FIG. 8 is a flowchart diagram of an example process 800 for proactive monitoring of a software application framework. The process 800 begins at operation 801 when the interface 118 of the load testing experiment server computing device 106 receives a load testing experiment request from a client computing device 101. The load testing experiment request may define one or more requested properties of a requested load testing experiment. In some embodiments, the interface 118 is a representation state transfer application programming interface (REST API).

At operation 802, the validator 112 of load testing experiment server computing device 106 determines whether the requested load testing experiment transmitted by the client computing device 101 includes one or more required data fields (e.g., required data fields defined by the schema of a load experiment definition data object for a load testing experiment). In response to determining that the load testing experiment request transmitted by the client computing device 101 does not include the required data fields, the validator 112 may reject the load testing experiment by transmitting a load testing rejection notification to the client computing device 101.

At operation 803, in response to determining that the load testing experiment request transmitted by the client computing device 101 includes the required data fields, the validator 112 transmits a load testing experiment definition data object corresponding to the load testing experiment request to the task executor 113 of the load testing experiment server computing device 106. In some embodiments, at operation 803, the validator 112 generates a load testing experiment definition data object based on at least one or more of the one or more requested properties and/or the one or more required data fields of a requested load testing experiment as defined by the load testing experiment request.

At operation 804, the task executor 113 determines, based on a load testing experiment definition data object, whether the load testing experiment corresponding to the load testing experiment definition data object should be performed on-demand or in a scheduled manner at a later time. If the task executor 113 determines that the load testing experiment definition data object should be performed in a scheduled manner at a later time, the task executor 113 provides the load testing experiment definition data object to a scheduler 114 of the load testing experiment server computing device 106.

At operation 805, if the task executor 113 determines that the load testing experiment definition data object should be performed on-demand, the task executor 113 provides the load testing experiment definition data object to the orchestrator 116 of the load testing experiment server computing device 106, which is then configured to perform proactive monitoring of the target software application framework in a multi-stage manner based on the load testing experiment definition data object.

At operation 806, an experiment build trigger 851 of the orchestrator 116 causes the experiment builder 115 of the load testing experiment server computing device 106 to retrieve experiment definition metadata for the load testing experiment definition data object and generate an augmented load testing experiment definition data object based on the experiment definition metadata and the load testing experiment definition data object. The experiment builder 115 provides the augmented load testing experiment definition data object to the experiment build trigger 851. In some embodiments, at operation 806, the experiment build trigger 851 provides an experiment definition for the load testing experiment to the experiment builder 115 and in response receives from the experiment builder 115 a structured version of the experiment definition (e.g., a JSON version of the experiment definition). In some embodiments, the experiment builder 115 supplements a partial experiment definition (e.g., a partial JSON-based experiment definition) with dynamic information (e.g., a list of Amazon Web Services (AWS) instances identifiers) in order to generate the final experiment definition, where the supplemented information of the final experiment definition may be used by the chaos engine 117 to perform fault inducement actions.

At operation 807, the experiment build trigger 851 receives the augmented load testing experiment definition data object from the experiment builder 115 and provides the augmented load testing experiment definition data object to a load generator trigger 852 of the orchestrator 116.

At operation 808, the load generator trigger 852 provides load increase action data (e.g., environment variables and API identifier) describing a load increase action defined by the augmented load testing experiment definition data object to the load generation server computing device 103, which in turn may cause the load generation server computing device 103 to perform one or more load increase actions defined by the augmented load testing experiment definition data object and provide the job identifiers of the load increase actions to the load generator trigger 852.

At operation 809, the load generator trigger 852 provides notification of the commencement of the load increase actions to the readiness check engine 853 of the orchestrator 116. This causes the load generator trigger 852 to perform a set of operations that are configured to determine if the target software application framework has reached a steady state. In some embodiments, this includes performing operation 810.

At operation 810, the readiness check engine 853 provides the job identifiers of the load increase actions to the load generation server computing device 103, which in turn causes the load generation server computing device 103 to provide operational status of the target software application framework during the execution of the load increase actions to the readiness check engine 853. The readiness check engine 853 utilizes such operational status data to determine whether the particular target software application framework has reached a steady state.

At operation 811, in response to determining that the target software application framework has reached a steady state, the readiness check engine 853 provides a notification of the steady state condition to a fault trigger 854 of the orchestrator 116. This causes the fault trigger 854 to, at operation 812, request that a chaos engine 117 of the load testing experiment server computing device 106 perform one or more fault inducement actions.

At operation 813, the chaos engine 117 performs the fault inducement actions with respect to the target software application framework by communicating with the target software application framework computing device 102. The chaos engine 117 transmits data about operational state of the target software application framework during the execution of the fault inducement actions to the fault trigger 854, which then transmits such data to the decision engine 855 of the orchestrator 116 at operation 814.

At operation 815, the decision engine 855 determines a fault inducement halt condition is satisfied. In response, at operation 816, the decision engine 855 transmits data about operational state of the target software application framework during at least a portion of the load testing experiment to the storage framework 111. Such operational data may, in some embodiments, be used by the interface 118 to generate predicted software resilience signatures and transmit such predicted software resilience signatures to the client computing device 101.

As described above, the interface 118 may be configured to cause display of a command-line interface for performing load testing experiments. For example, as depicted in the command-line interface 1000 of FIG. 10A, the command 1001 that is characterized by a load experiment definition data object defined by a load testing experiment template causes performing a load testing experiment to generate the load testing experiment output 1002. The load testing experiment corresponding to the command 1001 has generated an unsuccessful load testing experiment output 1071 indicating failure of the load testing experiment. As further depicted in the command-line interface 1050 of FIG. 10B, the command 1051 that is characterized by a JSON-based load experiment definition data object 1061 causes performing a load testing experiment to generate the load testing experiment output 1052. The load testing experiment corresponding to the command 1051 has generated a successful load testing experiment output 1072 indicating success of the load testing experiment.

Figure 11B:
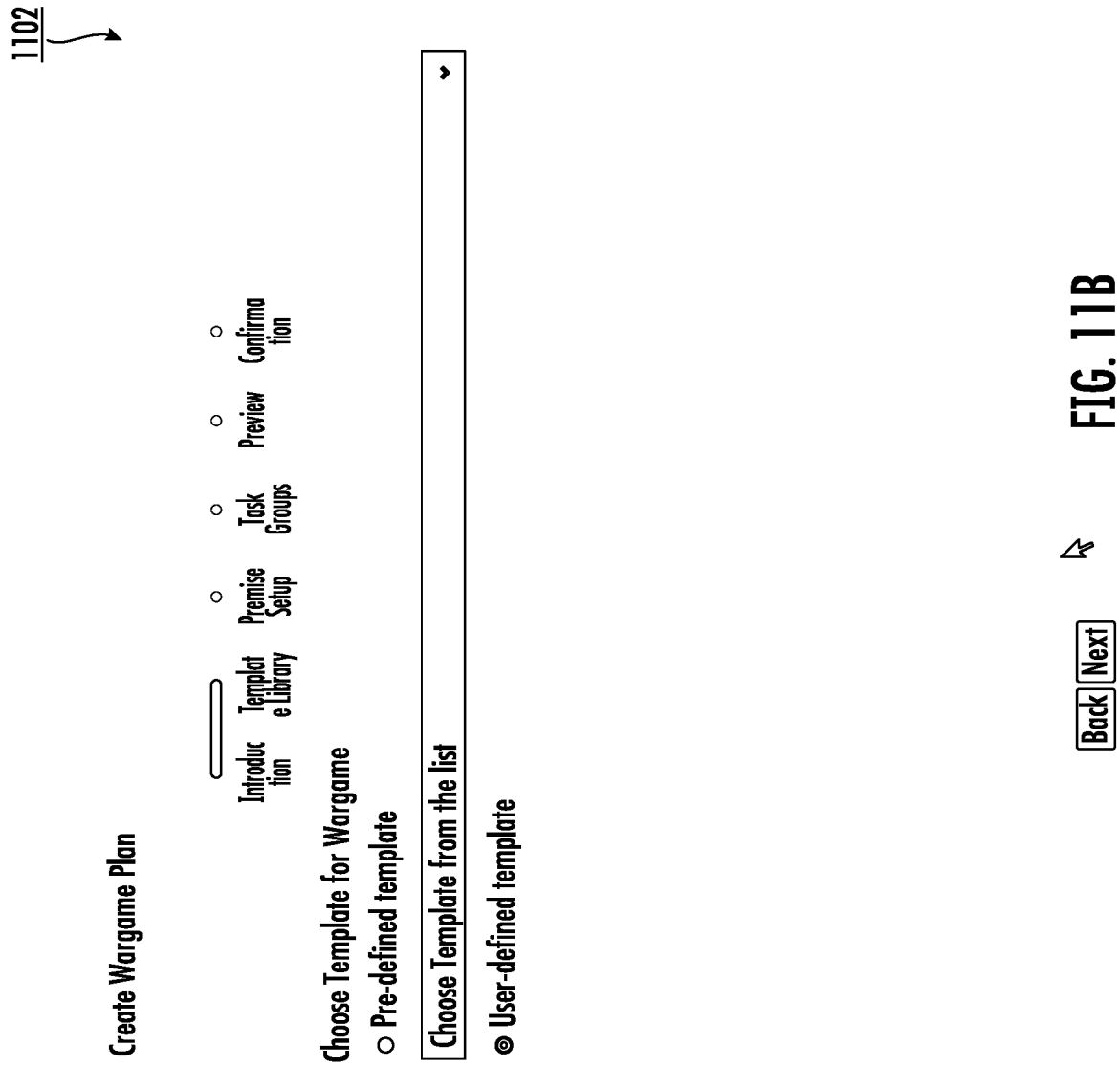
Figure 11C:
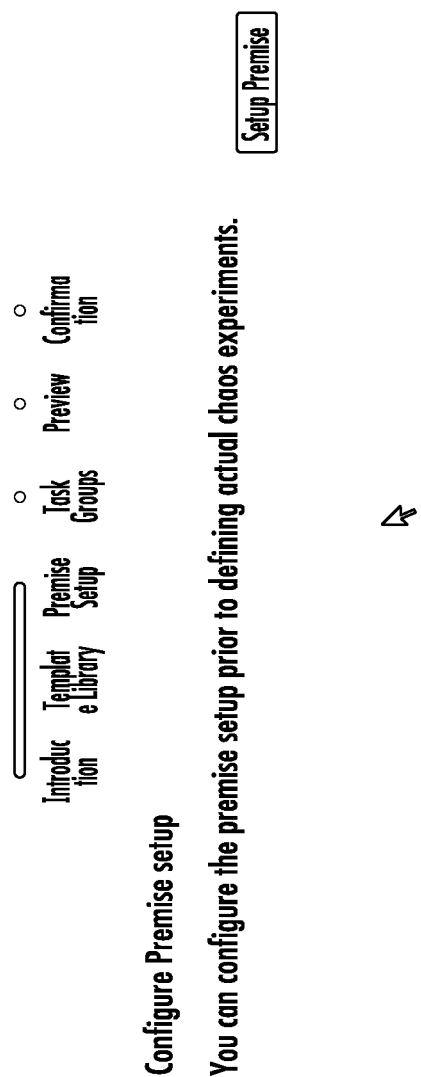

As further described above, the interface 118 may be configured to cause display of a set of graphical user interfaces for performing load testing experiments. Operational examples of such graphical user interfaces are depicted in FIGS. 11A-11I. As depicted in FIG. 11A, the graphical user interface 1101 enables defining a name and a micros environment for a load testing experiment. As depicted in FIG. 11B, the graphical user interface 1102 enables defining the load-testing experiment based on a pre-defined template or based on a newly-defined template. As depicted in FIG. 11C, the graphical user interface 1103 enables setting up a premise definition for the load testing experiment. As depicted in FIG. 11D, the graphical user interface 1104 enables defining premise parameters for the noted premise definition.

Figure 11E:
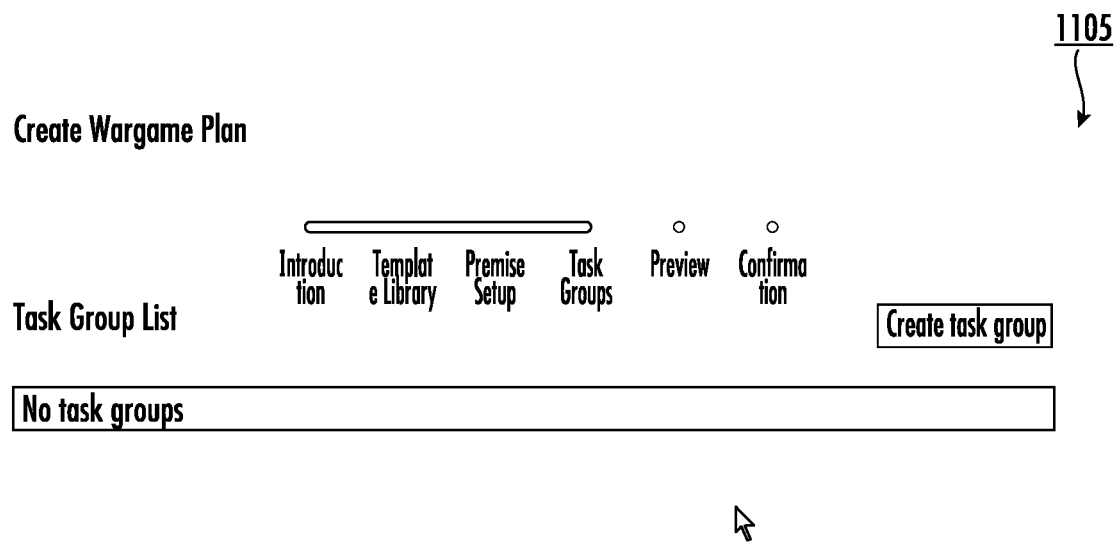
Figure 11F:
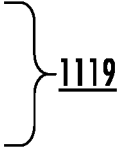
Figure 11G:
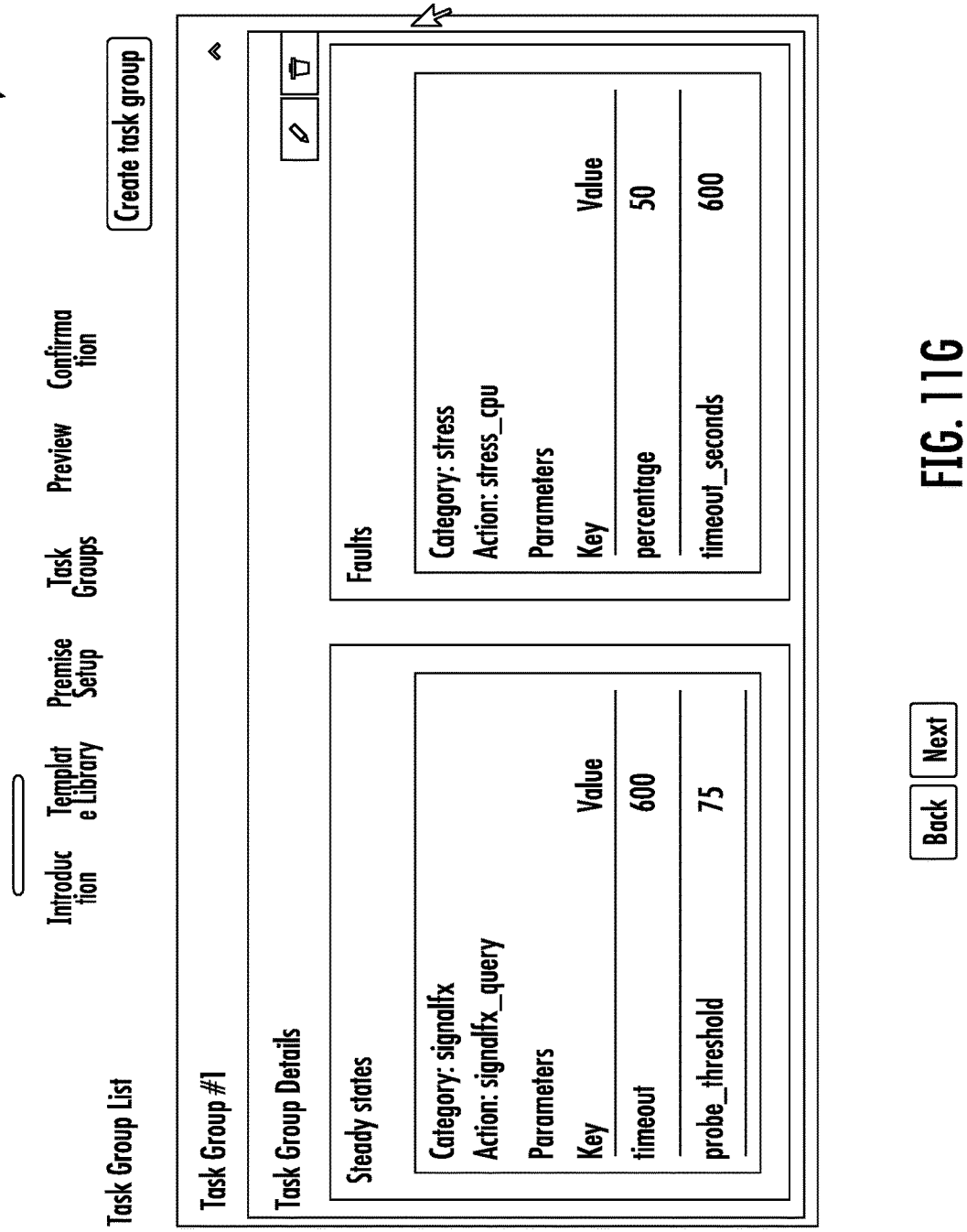

As depicted in FIG. 11E, the graphical user interface 1105 enables defining a task group definition including a steady state definition and a fault inducement action definition. As depicted in FIG. 11F, the graphical user interface 1106 enables defining the fault inducement action definition and the steady state definition for the task group definition. In particular, user interface element 1111 enables defining a fault inducement execution parameter related to a fault category and user interface element 1112 enables defining a fault inducement execution parameter related to a fault action type. Moreover, user interface element 1113 enables defining a probe category for a steady state probe action, user interface element 1114 enables defining a probe action type for a steady state probe action, user interface element 1115 enables defining a probe metric type for a probe metric for a steady state probe condition, user interface element 1116 enables defining a probe metric for a steady state probe action, user interface element 1117 enables defining a probe threshold for a steady state probe condition, user interface element 1118 enables defining a probe action duration for a steady state probe condition, and user interface elements 1119 enable selecting an operator override input format for forcing a positive value with respect to a steady state probe condition. As depicted in FIG. 11G, the graphical user interface 1107 enables selecting a defined task group definition.

Figure 11I:
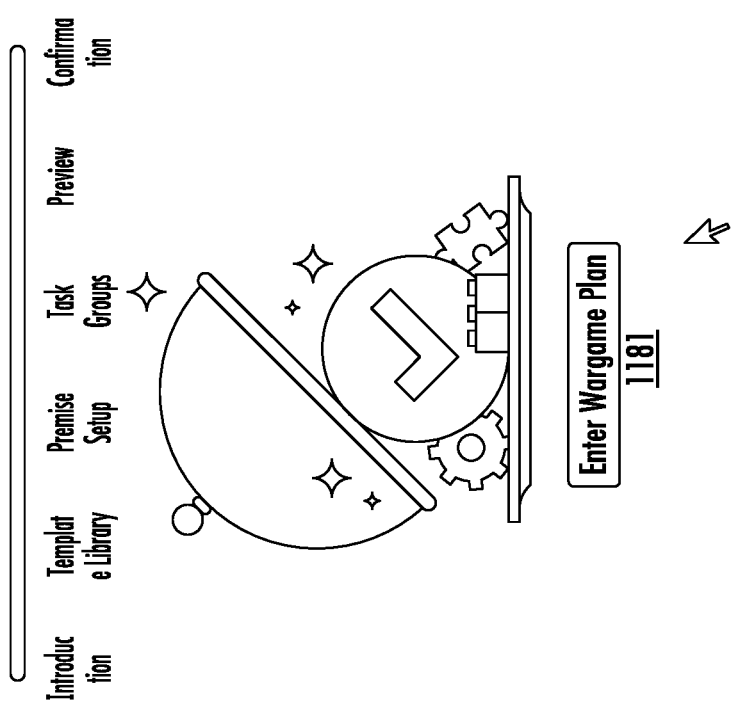

As depicted in FIG. 11H, the graphical user interface 1108 enables reviewing the load testing experiment definition data including the premise definition data 1171 and the task group definition data 1172. As depicted in FIG. 11I, the graphical user interface 1109 enables initiating the load testing experiment based on the load testing experiment definition data by selecting the user interface element 1181.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an limited interaction mode and/or a non-limited interaction mode for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language page), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending pages to and receiving pages from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. A computer-implemented method for proactive monitoring of a target software application framework, the computer-implemented method comprising:
    identifying a load testing experiment definition data object, wherein the load testing experiment definition data object describes a load increase action definition, a steady state definition, and a fault inducement action definition;
    causing execution of one or more load increase operations with respect to the target software application framework, wherein the one or more load increase operations satisfy one or more load increase execution parameters described by the load increase definition, wherein the one or more load increase execution parameters define source locations for user activity data used in the one or more load increase operations, and
    wherein the one or more load increase execution parameters comprise a load increase magnitude parameter, a load increase parallel execution mode parameter that determines whether the one or more load increase operations are performed in parallel or sequentially, and a load increase execution parameter that determines whether retrieval of the user activity data used in the one or more load increase operations is performed in parallel or sequentially;
    during the execution of the one or more load increase action operations, monitoring the target software application framework to determine whether the target software application framework satisfies one or more steady state probe conditions defined by the steady state definition;
    in response to determining that the target software application framework satisfies the one or more steady state probe conditions, causing execution of one or more fault inducement operations with respect to the target software application framework, wherein the one or more fault inducement operations are defined by the fault inducement action definition;
    during the execution of the one or more fault inducement operations, monitoring the target software application framework to determine whether the target software application framework satisfies at least one of one or more fault inducement halt conditions, wherein the one or more one or more fault inducement halt conditions are determined based at least in part on the one or more steady state probe conditions;
    in response to determining that the target software application framework satisfies the one or more fault inducement halt conditions, determining a current operational state of the target software application framework; and
    generating a predicted software resilience signature for the target software application framework based on the current operational state of the target software application framework.

2. The computer-implemented method of claim 1, wherein the one or more fault inducement halt conditions comprise at least one of:
    a fault inducement halt condition that is characterized by failure of the target software application framework to satisfy at least one of the one or more steady state probe conditions during the execution of the one or more fault inducement operations;
    a fault inducement halt condition that is characterized by a fault duration parameter defined by the fault inducement action definition; and
    a fault inducement halt condition that is characterized by a software breakdown parameter defined by the fault inducement action definition.

3. The computer-implemented method of claim 1, further comprising:
    in response to determining that the target software application framework satisfies the one or more fault inducement halt conditions:
        causing execution of one or more fault inducement halt operations, wherein the one or more fault inducement halt operations are configured to halt the execution of the one or more fault inducement operations, and
        causing execution of one or more fault inducement rollback operations, wherein the one or more fault inducement rollback operations are configured to roll back the execution of the one or more fault inducement operations.

4. The computer-implemented method of claim 1, wherein determining the current operational state of the target software application framework is performed based on one or more post-halt probing parameters defined by the fault inducement action definition.

5. The computer-implemented method of claim 1, wherein the one or more fault inducement operations defined by the fault inducement action definition comprise at least two distinct fault inducement operations, wherein the at least two distinct fault inducement operations can be executed on the target software application framework in parallel.

6. An apparatus for proactive monitoring of a target software application framework, the apparatus comprising at least one processor and at least one memory including program code, the at least one memory and the program code configured to, with the processor, cause the apparatus to at least:
- identify a load testing experiment definition data object, wherein the load testing experiment definition data object describes a load increase action definition, a steady state definition, and a fault inducement action definition;
- cause execution of one or more load increase operations with respect to the target software application framework, wherein the one or more load increase operations satisfy one or more load increase execution parameters described by the load increase definition, wherein the one or more load increase execution parameters define source locations for user activity data used in the one or more load increase operations, and
- wherein the one or more load increase execution parameters comprise a load increase magnitude parameter, a load increase parallel execution mode parameter that determines whether the one or more load increase operations are performed in parallel or sequentially, and a load increase execution parameter that determines whether retrieval of the user activity data used in the one or more load increase operations is performed in parallel or sequentially;
- during the execution of the one or more load increase action operations, monitor the target software application framework to determine whether the target software application framework satisfies one or more steady state probe conditions defined by the steady state definition;
- in response to determining that the target software application framework satisfies the one or more steady state probe conditions, cause execution of one or more fault inducement operations with respect to the target software application framework, wherein the one or more fault inducement operations are defined by the fault inducement action definition;
- during the execution of the one or more fault inducement operations, monitor the target software application framework to determine whether the target software application framework satisfies at least one of one or more fault inducement halt conditions, wherein the one or more one or more fault inducement halt conditions are determined based at least in part on the one or more steady state probe conditions;
- in response to determining that the target software application framework satisfies the one or more fault inducement halt conditions, determine a current operational state of the target software application framework; and
- generate a predicted software resilience signature for the target software application framework based on the current operational state of the target software application framework.

7. The apparatus of claim 6, wherein the one or more fault inducement halt conditions comprise at least one of:
- a fault inducement halt condition that is characterized by failure of the target software application framework to satisfy at least one of the one or more steady state probe conditions during the execution of the one or more fault inducement operations;
- a fault inducement halt condition that is characterized by a fault duration parameter defined by the fault inducement action definition; and
- a fault inducement halt condition that is characterized by a software breakdown parameter defined by the fault inducement action definition.

8. The apparatus of claim 1, wherein the at least one memory and the program code are further configured to, with the processor, cause the apparatus to at least:
- in response to determining that the target software application framework satisfies the one or more fault inducement halt conditions:
  - cause execution of one or more fault inducement halt operations, wherein the one or more fault inducement halt operations are configured to halt the execution of the one or more fault inducement operations, and
  - cause execution of one or more fault inducement rollback operations, wherein the one or more fault inducement rollback operations are configured to roll back the execution of the one or more fault inducement operations.

9. The apparatus of claim 1, wherein determining the current operational state of the target software application framework is performed based on one or more post-halt probing parameters defined by the fault inducement action definition.

10. The apparatus of claim 1, wherein causing the execution of the one or more load increase action operations comprises causing a load generation server to perform a simulated usage load scenario with respect to the target software application framework.

11. The apparatus of claim 1, wherein each steady state probe condition of the one or more steady state probe conditions is characterized by a probe category, a probe action type, a probe metric value, and a probe threshold.

12. The apparatus of claim 1, wherein each fault inducement operation of the one or more fault inducement operations is characterized by a fault category, a fault action type, and a fault container.

13. The apparatus of claim 1, wherein the one or more fault inducement operations defined by the fault inducement action definition comprise at least two distinct fault inducement operations, wherein the at least two distinct fault inducement operations can be executed on the target software application framework in parallel.

14. The apparatus of claim 1, wherein the predicted software resilience signature generated based on the current operational state of the target software application framework is a data object comprising at least one of a detailed operational report, a weakness assessment report, and an operational assessment report.

15. The apparatus of claim 1, wherein the one or more fault inducement operations defined by the fault inducement action definition comprise at least two distinct fault inducement operations, wherein the at least two distinct fault inducement operations are configured for sequential execution on the target software application framework, and wherein one or more fault inducement rollback operations configured to roll back the execution of the at least two distinct fault inducement operations are configured for execution after each of the respective at least two distinct fault inducement operations have been executed.

16. The apparatus of claim 6, wherein the load testing experiment definition data object comprises two or more steady state definitions, wherein the two or more steady state definitions define respective steady state probe conditions associated with two or more respective load increase operations, and wherein the two or more respective load increase operations are associated with two or more respective portions of user activity data associated with two or more respective groups of user profiles having distinct access levels.

17. A computer program product for proactive monitoring of a target software application framework, the computer program product comprising at least one non-transitory computer-readable storage medium having computer-readable program code portions stored therein, the computer-readable program code portions configured to:

identify a load testing experiment definition data object, wherein the load testing experiment definition data object describes a load increase action definition, a steady state definition, and a fault inducement action definition;

cause execution of one or more load increase operations with respect to the target software application framework, wherein the one or more load increase operations satisfy one or more load increase execution parameters described by the load increase definition, wherein the one or more load increase execution parameters define source locations for user activity data used in the one or more load increase operations, and wherein the one or more load increase execution parameters comprise a load increase magnitude parameter, a load increase parallel execution mode parameter that determines whether the one or more load increase operations are performed in parallel or sequentially, and a load increase execution parameter that determines whether retrieval of the user activity data used in the one or more load increase operations is performed in parallel or sequentially;

during the execution of the one or more load increase action operations, monitor the target software application framework to determine whether the target software application framework satisfies one or more steady state probe conditions defined by the steady state definition;

in response to determining that the target software application framework satisfies the one or more steady state probe conditions, cause execution of one or more fault inducement operations with respect to the target software application framework, wherein the one or more fault inducement operations are defined by the fault inducement action definition;

during the execution of the one or more fault inducement operations, monitor the target software application framework to determine whether the target software application framework satisfies at least one of one or more fault inducement halt conditions, wherein the one or more one or more fault inducement halt conditions are determined based at least in part on the one or more steady state probe conditions;

in response to determining that the target software application framework satisfies the one or more fault inducement halt conditions, determine a current operational state of the target software application framework; and generate a predicted software resilience signature for the target software application framework based on the current operational state of the target software application framework.

* * * * *

UNITED STATES PATENT AND TRADEMARK OFFICE
CERTIFICATE OF CORRECTION

PATENT NO. : 11,748,242 B2
APPLICATION NO. : 17/177806
DATED : September 5, 2023
INVENTOR(S) : Chaudhary et al.

Page 1 of 1

It is certified that error appears in the above-identified patent and that said Letters Patent is hereby corrected as shown below:

In the Claims

Column 36,
Lines 18, 34, 39, 44, 48, 52, 58, and 64, each occurrence, "claim 1" should read --claim 6--.

Signed and Sealed this
Twenty-first Day of May, 2024

Katherine Kelly Vidal
*Director of the United States Patent and Trademark Office*